(12) United States Patent
Taylor et al.

(10) Patent No.: US 7,323,790 B2
(45) Date of Patent: Jan. 29, 2008

(54) WAVE ENERGY CONVERTERS (WECS) WITH LINEAR ELECTRIC GENERATORS (LEGS)

(75) Inventors: George W. Taylor, Princeton, NJ (US); David B. Stewart, Cranbury, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 315 days.

(21) Appl. No.: 11/081,900

(22) Filed: Mar. 15, 2005

(65) Prior Publication Data

US 2006/0208839 A1    Sep. 21, 2006

(51) Int. Cl.
F03B 13/12 (2006.01)
F03B 13/10 (2006.01)
H02P 9/04 (2006.01)

(52) U.S. Cl. .................................. 290/42; 290/53
(58) Field of Classification Search ................ 290/42, 290/53
See application file for complete search history.

(56) References Cited

U.S. PATENT DOCUMENTS

| | | | | |
|---|---|---|---|---|
| 3,362,336 A * | 1/1968 | Kafka | .................. | 417/331 |
| 3,696,251 A * | 10/1972 | Last et al. | .................. | 290/53 |
| 3,783,302 A * | 1/1974 | Woodbridge | .................. | 290/42 |
| 4,110,630 A * | 8/1978 | Hendel | .................. | 290/53 |
| 4,206,601 A * | 6/1980 | Eberle | .................. | 60/398 |
| 4,232,230 A * | 11/1980 | Ames | .................. | 290/53 |
| 4,260,901 A * | 4/1981 | Woodbridge | .................. | 290/42 |
| 4,423,334 A * | 12/1983 | Jacobi et al. | .................. | 290/53 |
| 4,539,485 A * | 9/1985 | Neuenschwander | .......... | 290/53 |
| 4,672,222 A * | 6/1987 | Ames | .................. | 290/53 |
| 4,996,840 A * | 3/1991 | Marx | .................. | 60/507 |
| 5,167,786 A * | 12/1992 | Eberle | .................. | 204/228.2 |
| 5,696,413 A * | 12/1997 | Woodbridge et al. | .......... | 310/15 |
| 6,020,653 A * | 2/2000 | Woodbridge et al. | .......... | 290/53 |
| 6,644,027 B1 * | 11/2003 | Kelly | .................. | 60/498 |
| 6,791,205 B2 * | 9/2004 | Woodbridge | .................. | 290/53 |
| 6,864,592 B1 * | 3/2005 | Kelly | .................. | 290/42 |
| 6,956,299 B2 * | 10/2005 | Serrano Molina et al. | .... | 290/42 |
| 7,012,340 B2 * | 3/2006 | Yi | .................. | 290/42 |
| 7,042,112 B2 * | 5/2006 | Wood | .................. | 290/53 |
| 7,045,912 B2 * | 5/2006 | Leijon et al. | .................. | 290/42 |
| 7,141,888 B2 * | 11/2006 | Sabol et al. | .................. | 290/53 |
| 7,164,212 B2 * | 1/2007 | Leijon et al. | .................. | 290/42 |
| 7,168,532 B2 * | 1/2007 | Stewart et al. | ............... | 188/161 |
| 7,184,363 B2 * | 2/2007 | Szegedi et al. | ................. | 367/3 |
| 7,199,481 B2 * | 4/2007 | Hirsch | .................. | 290/42 |
| 7,242,106 B2 * | 7/2007 | Kelly | .................. | 290/42 |
| 2004/0061338 A1 * | 4/2004 | Woodbridge | ................. | 290/53 |

(Continued)

Primary Examiner—Julio Gonzalez
Assistant Examiner—Pedro J. Cuevas
(74) Attorney, Agent, or Firm—Henry I. Schanzer

(57) ABSTRACT

An ocean wave energy converter (WEC) utilizes the relative motion between permanent magnet and induction coil assemblies to generate electricity. The permanent magnet assemblies and induction coil assemblies are separately housed in watertight enclosures, enabling a wide range of wave energy converter configurations, nearly unlimited stroke and obviating the need for a common magnet/coil enclosure with seals. The magnet assemblies are constructed with surface or buried magnets. The wave motion moves a magnet assembly relative to a stationary coil assembly, or vice versa. Either the magnet assembly or the induction coil assembly are made long enough to provide the generation of electricity over a desired operational range of travel. Various means are provided to maintain the spacing ("gap") between the magnetic and coil assemblies relatively constant.

15 Claims, 39 Drawing Sheets

U.S. PATENT DOCUMENTS

| | | | |
|---|---|---|---|
| 2004/0239120 A1* | 12/2004 | Yi | 290/42 |
| 2004/0251692 A1* | 12/2004 | Leijon et al. | 290/42 |
| 2005/0121915 A1* | 6/2005 | Leijon et al. | 290/42 |
| 2005/0167988 A1* | 8/2005 | Wood | 290/53 |
| 2005/0206247 A1* | 9/2005 | Stewart et al. | 310/12 |
| 2005/0218728 A1* | 10/2005 | Stewart et al. | 310/12 |
| 2005/0230206 A1* | 10/2005 | Stewart et al. | 188/381 |
| 2005/0235641 A1* | 10/2005 | Sabol et al. | 60/497 |
| 2005/0237775 A1* | 10/2005 | Sabol et al. | 363/178 |
| 2005/0285402 A1* | 12/2005 | Ames | 290/42 |
| 2006/0208839 A1* | 9/2006 | Taylor et al. | 335/205 |
| 2006/0273594 A1* | 12/2006 | Gehring | 290/42 |
| 2007/0040384 A1* | 2/2007 | Bernhoff et al. | 290/42 |
| 2007/0080539 A1* | 4/2007 | Kelly | 290/42 |
| 2007/0090652 A1* | 4/2007 | Leijon et al. | 290/53 |
| 2007/0132246 A1* | 6/2007 | Hirsch | 290/42 |
| 2007/0158950 A1* | 7/2007 | Crespo | 290/53 |
| 2007/0164569 A1* | 7/2007 | Wolfe | 290/53 |
| 2007/0164615 A1* | 7/2007 | Lewis et al. | 310/12 |

* cited by examiner

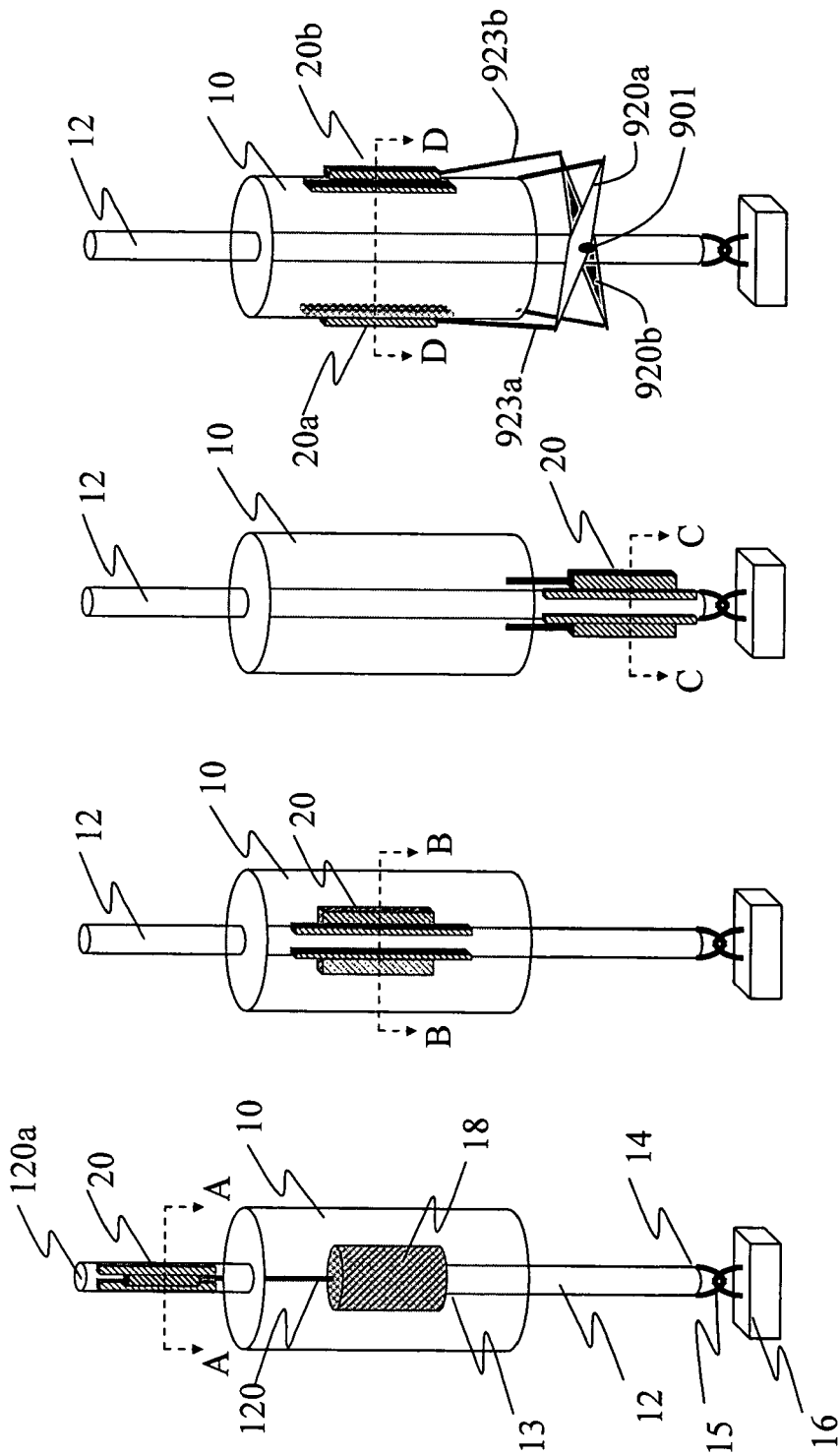

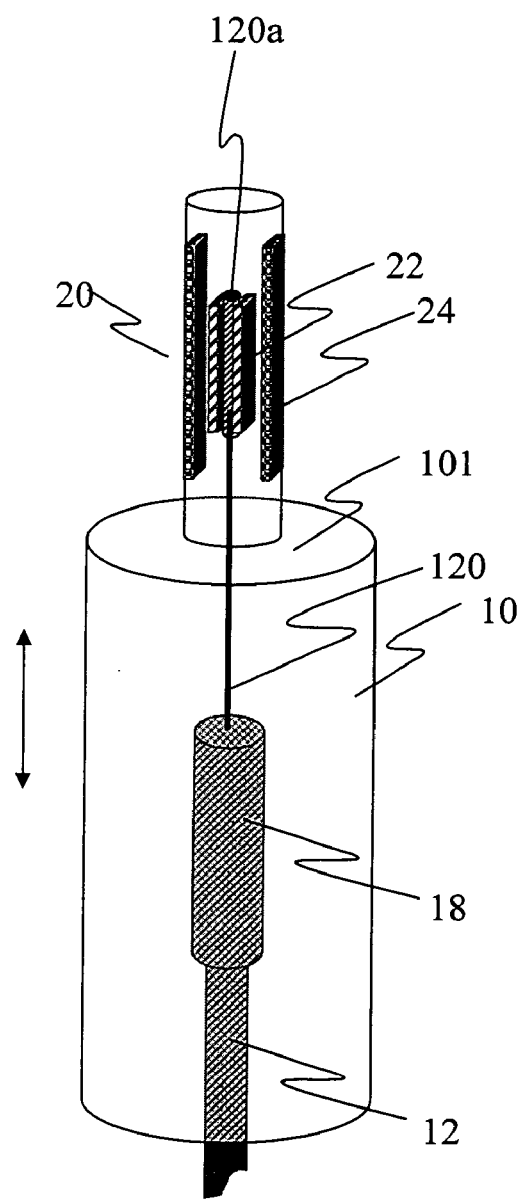
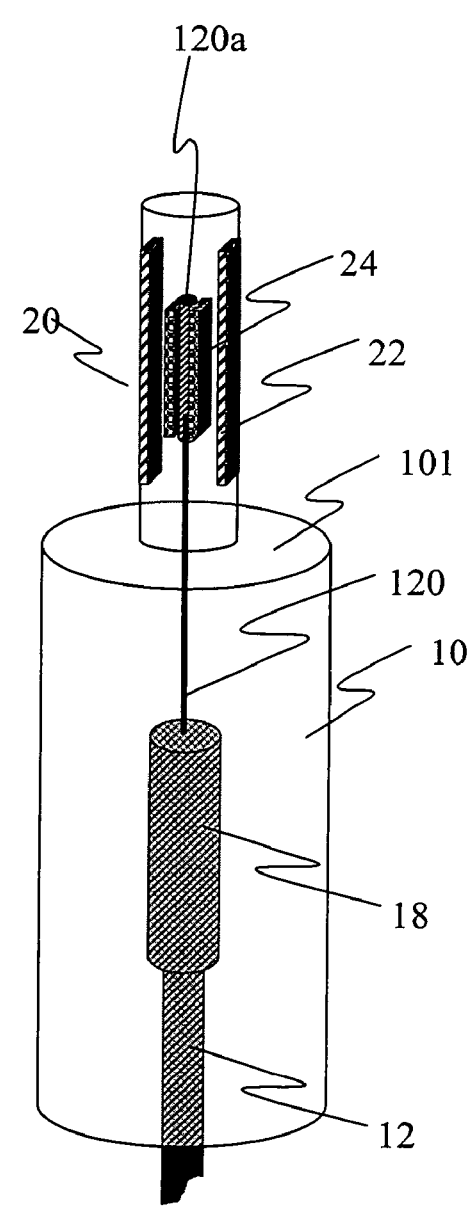
FIGURE 1A1  FIGURE 1A2

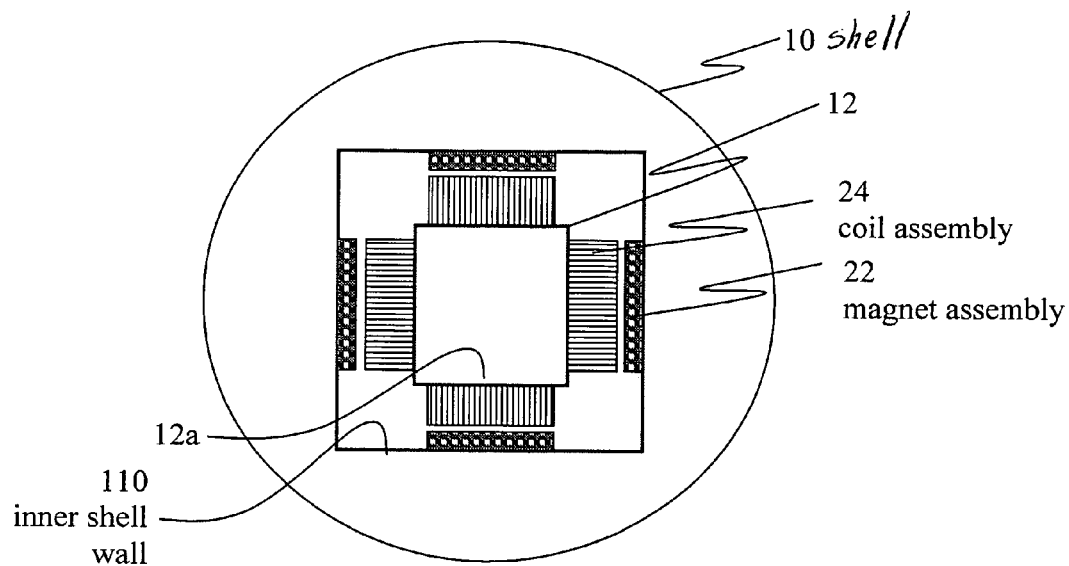
FIGURE 1B1
Cross-sectional View of Four-sided LEG
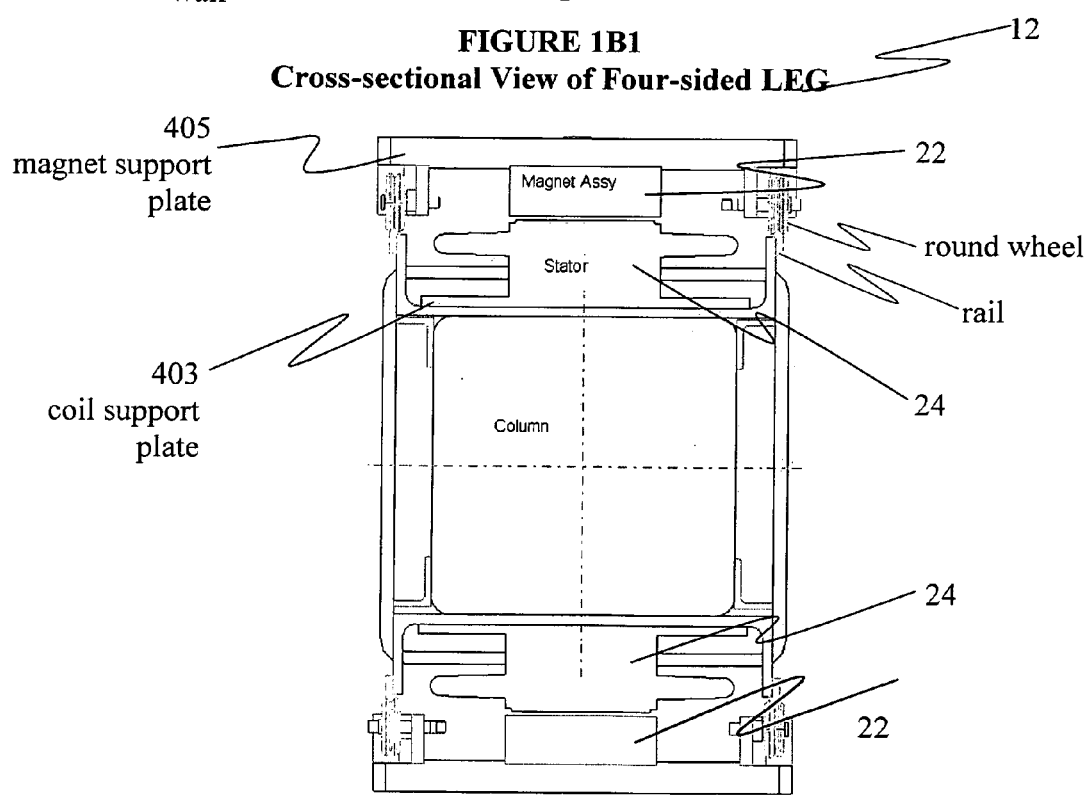
FIGURE 1B2
Cross-sectional View of Two-sided LEG

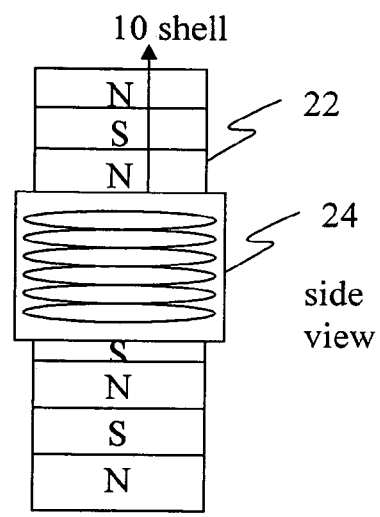
FIGURE 1C3
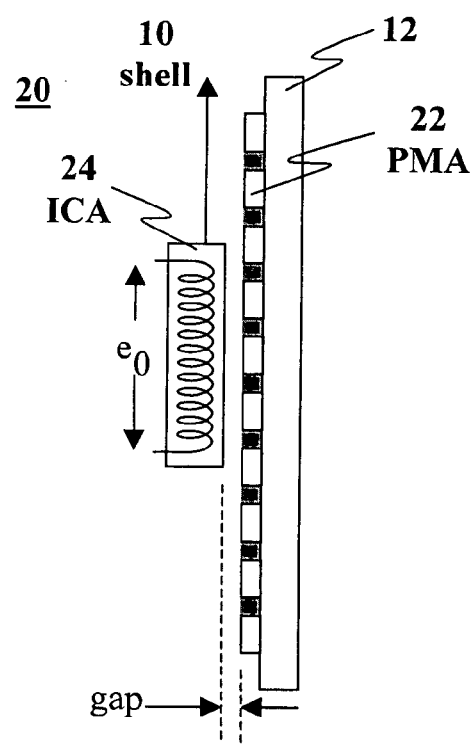
FIGURE 1C1
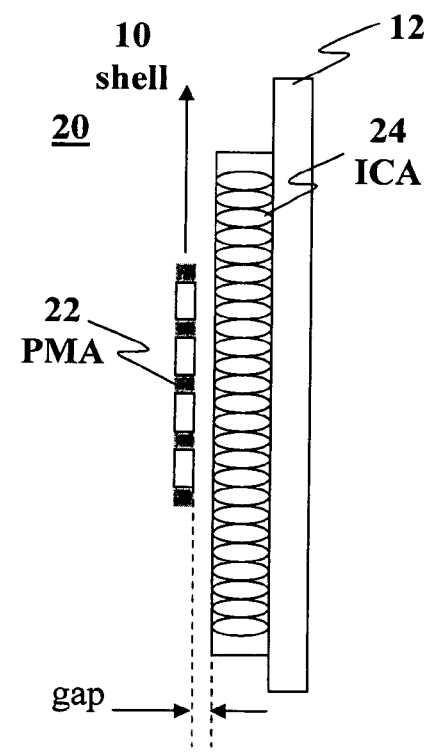
FIGURE 1C2

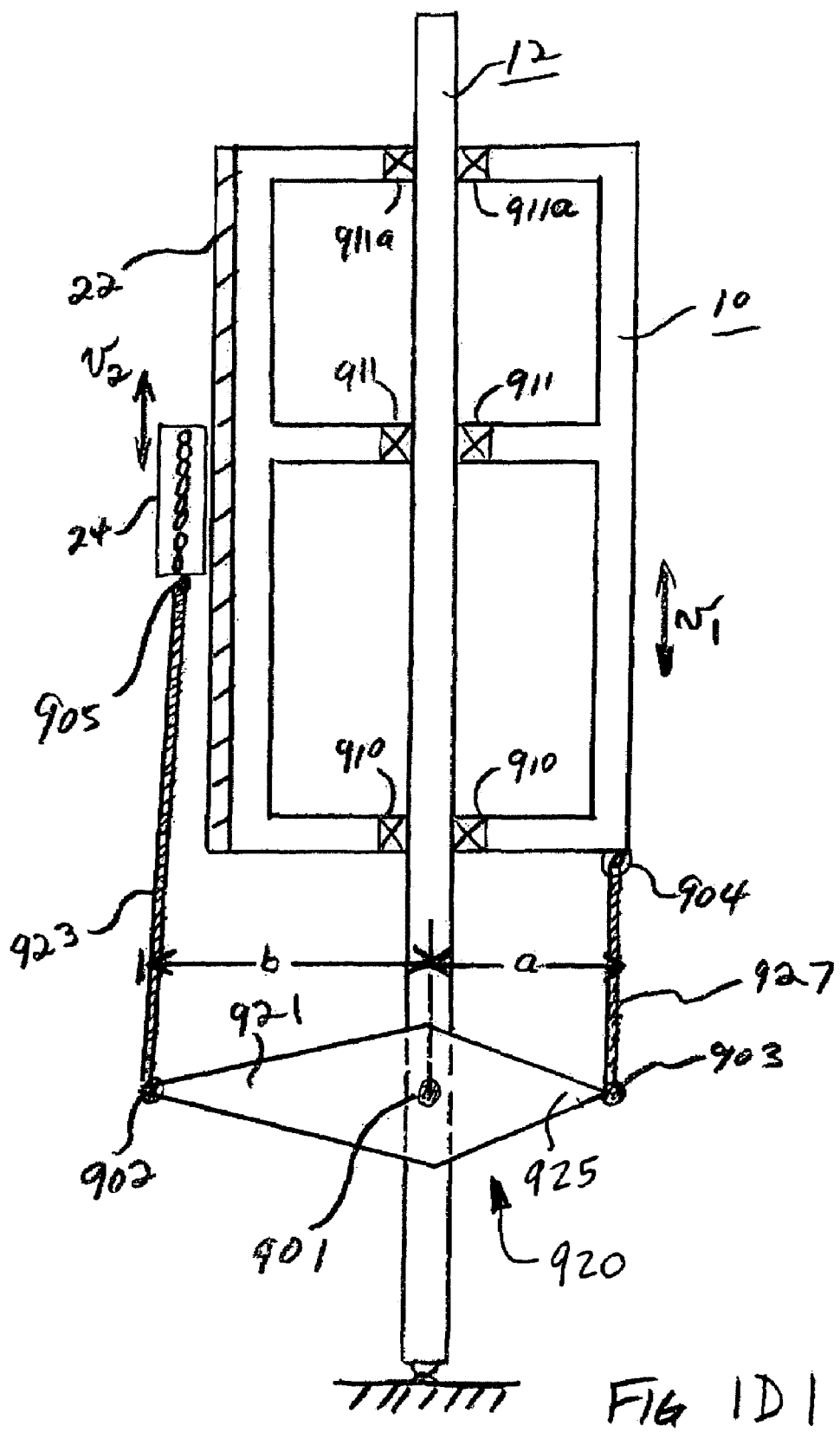
FIG 1D1

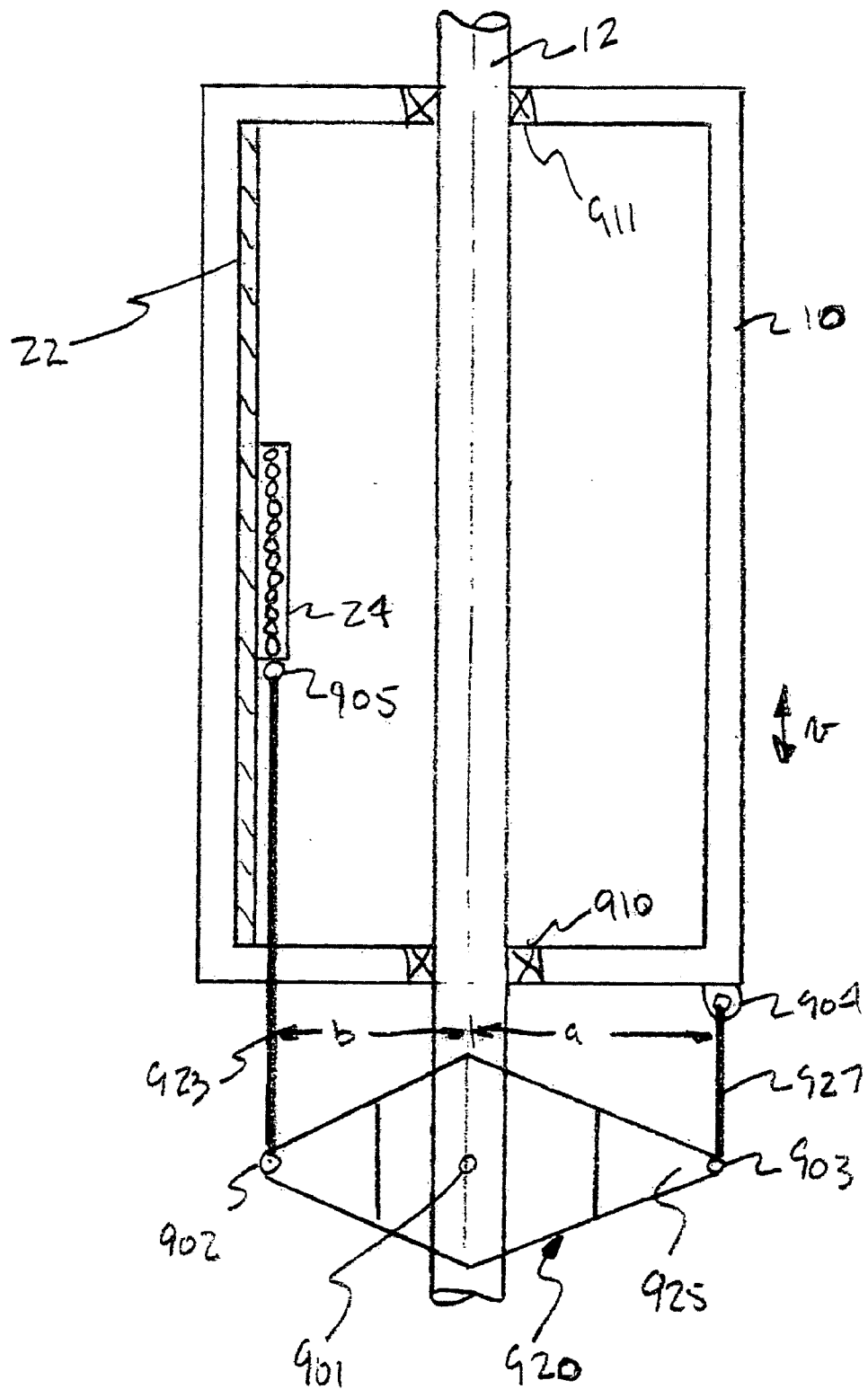
FIG 1D2

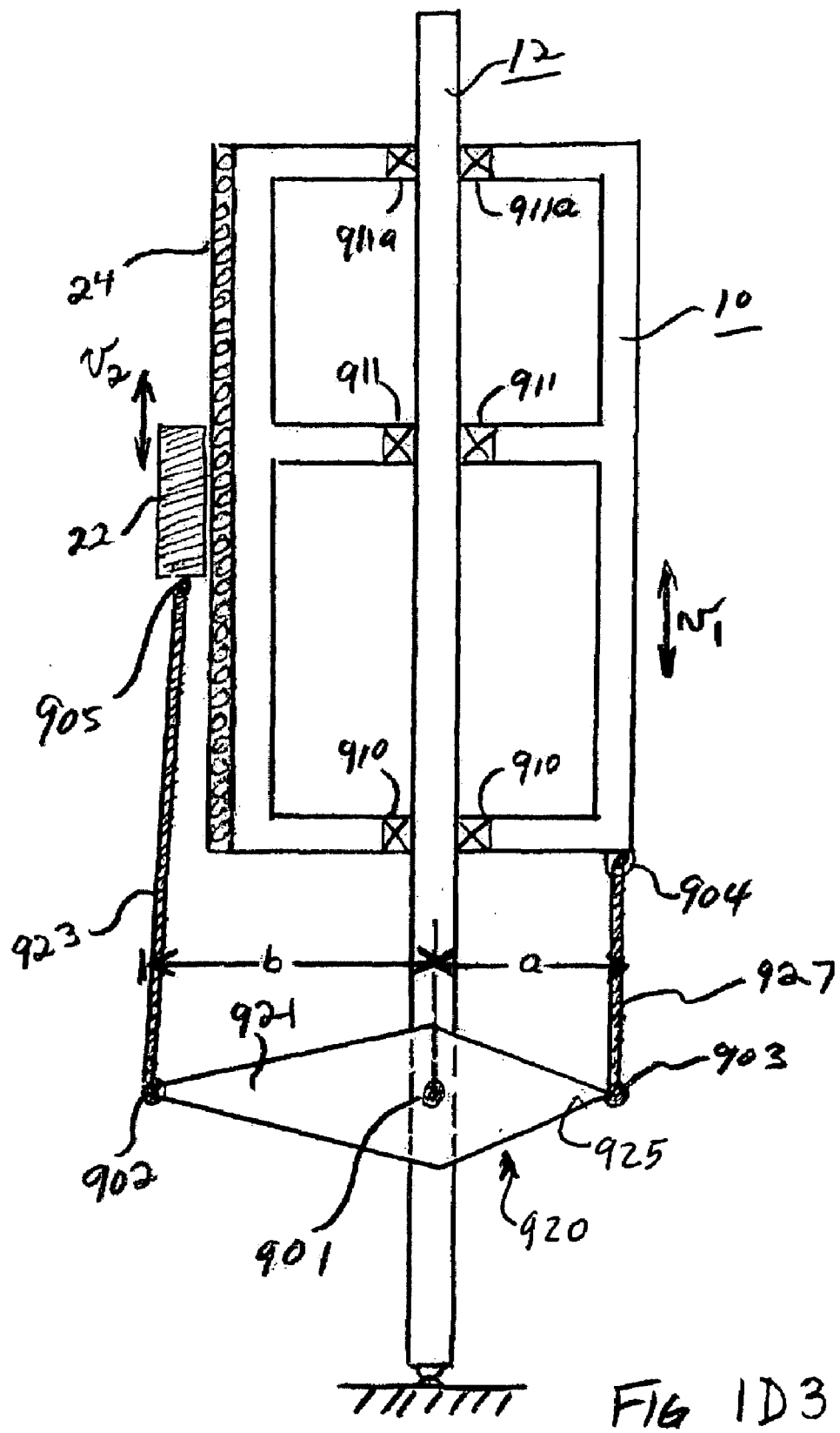
FIG 1D3

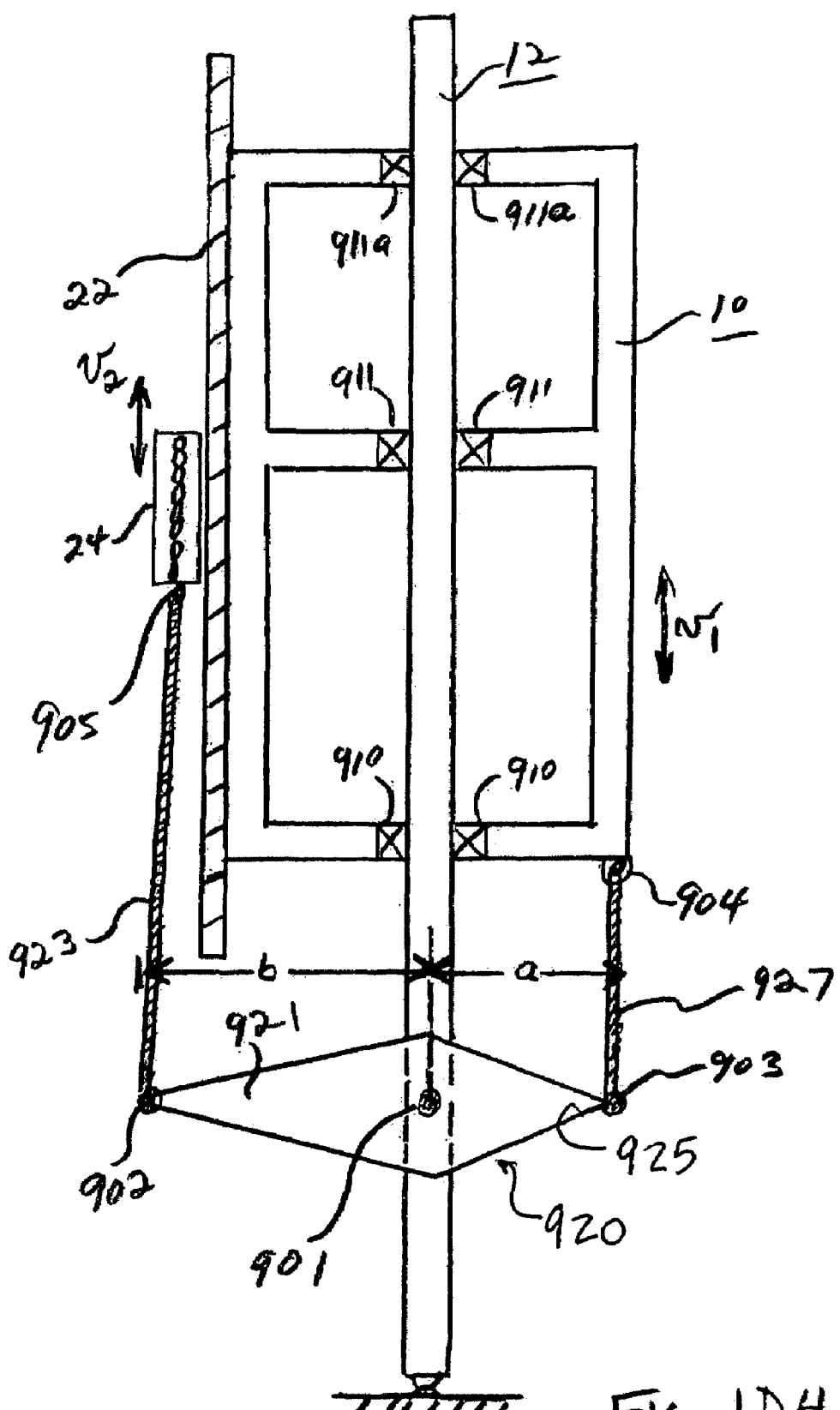
FIG 1D4

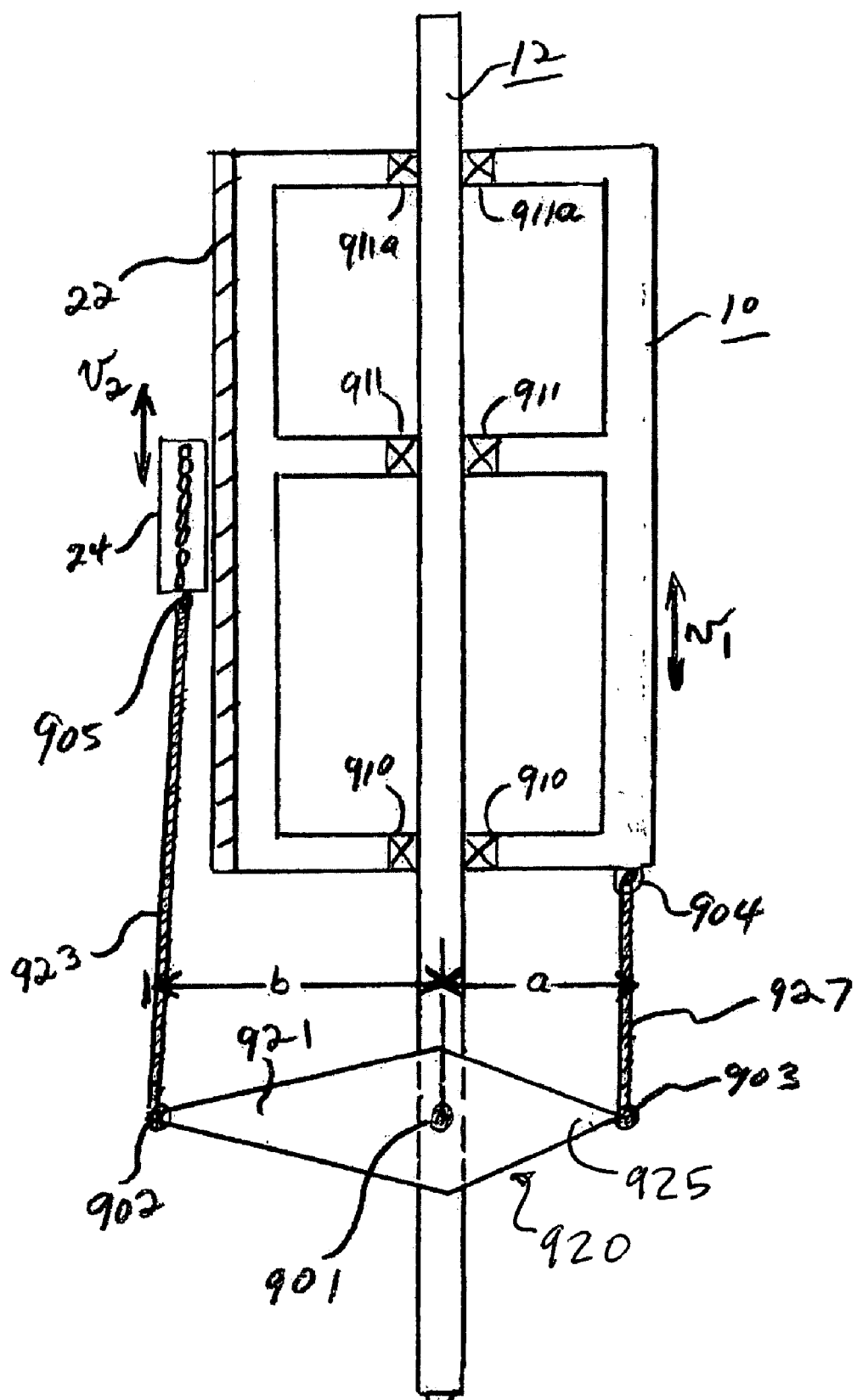
FIG 1D5

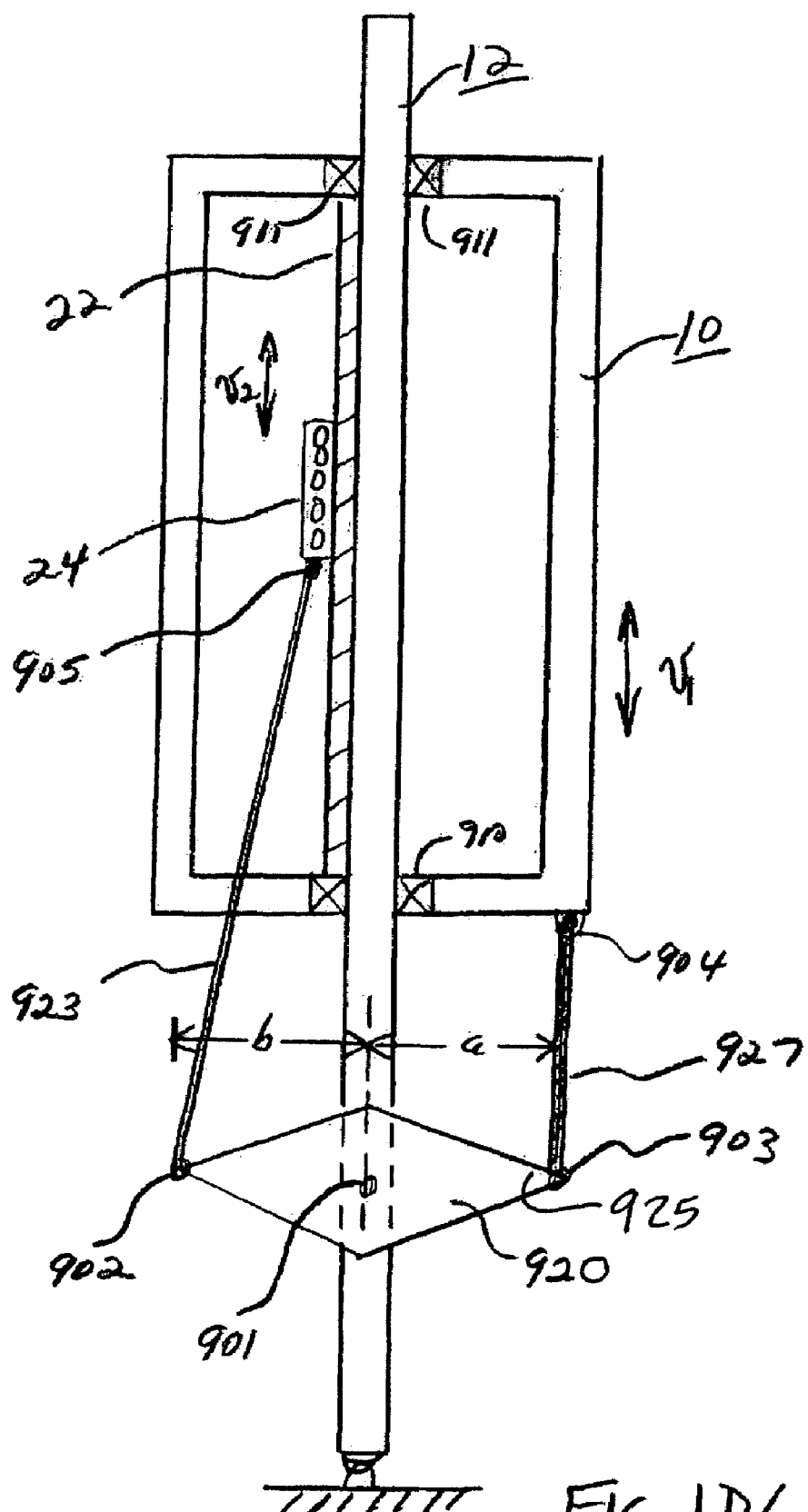
FIG 1D6

Dual Absorber WEC w/LEG

Dual Absorber WEC w/LEG

Dual Absorber WEC w/LEG

Dual Absorber WEC w/LEG

Cross-section of WEC w/LEG

Cross-section of WEC w/LEG

Cross-section of WEC w/LEG

Cross-section of WEC w/LEG

LEG Surface Permanent Magnet
Configuration

LEG Buried Permanent Magnet Configuration

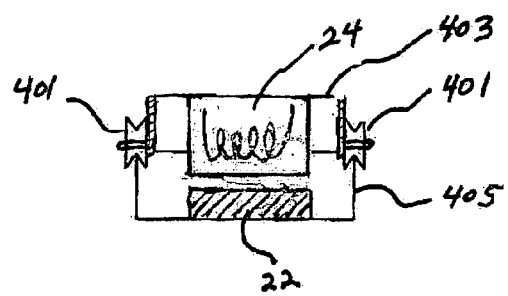
FIGURE 4C2
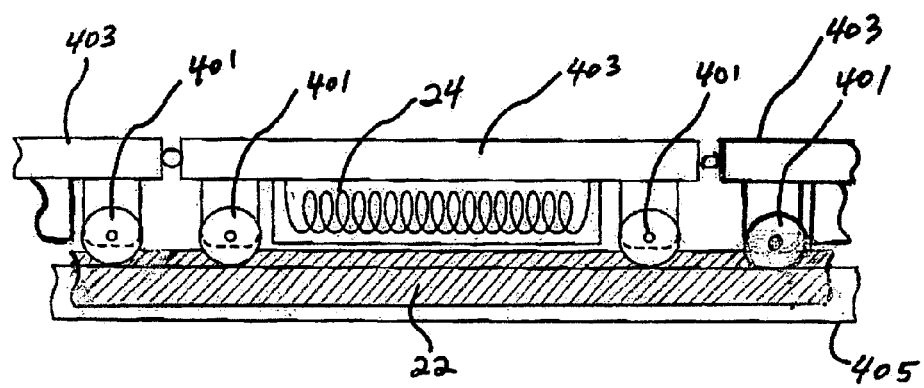
FIGURE 4C3
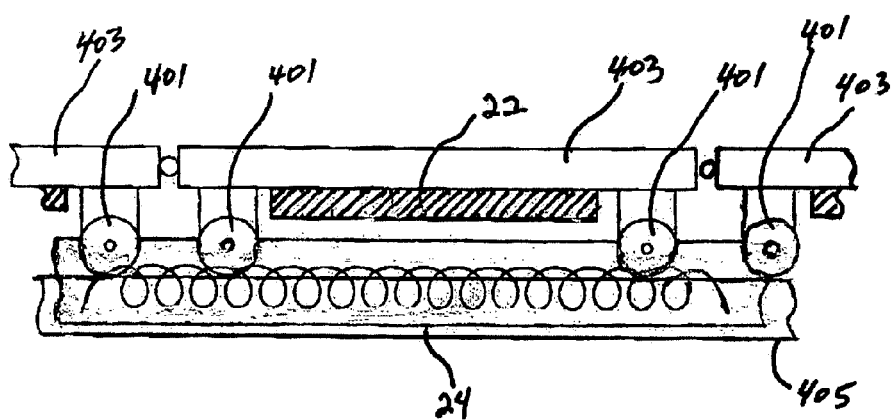
FIGURE 4C4

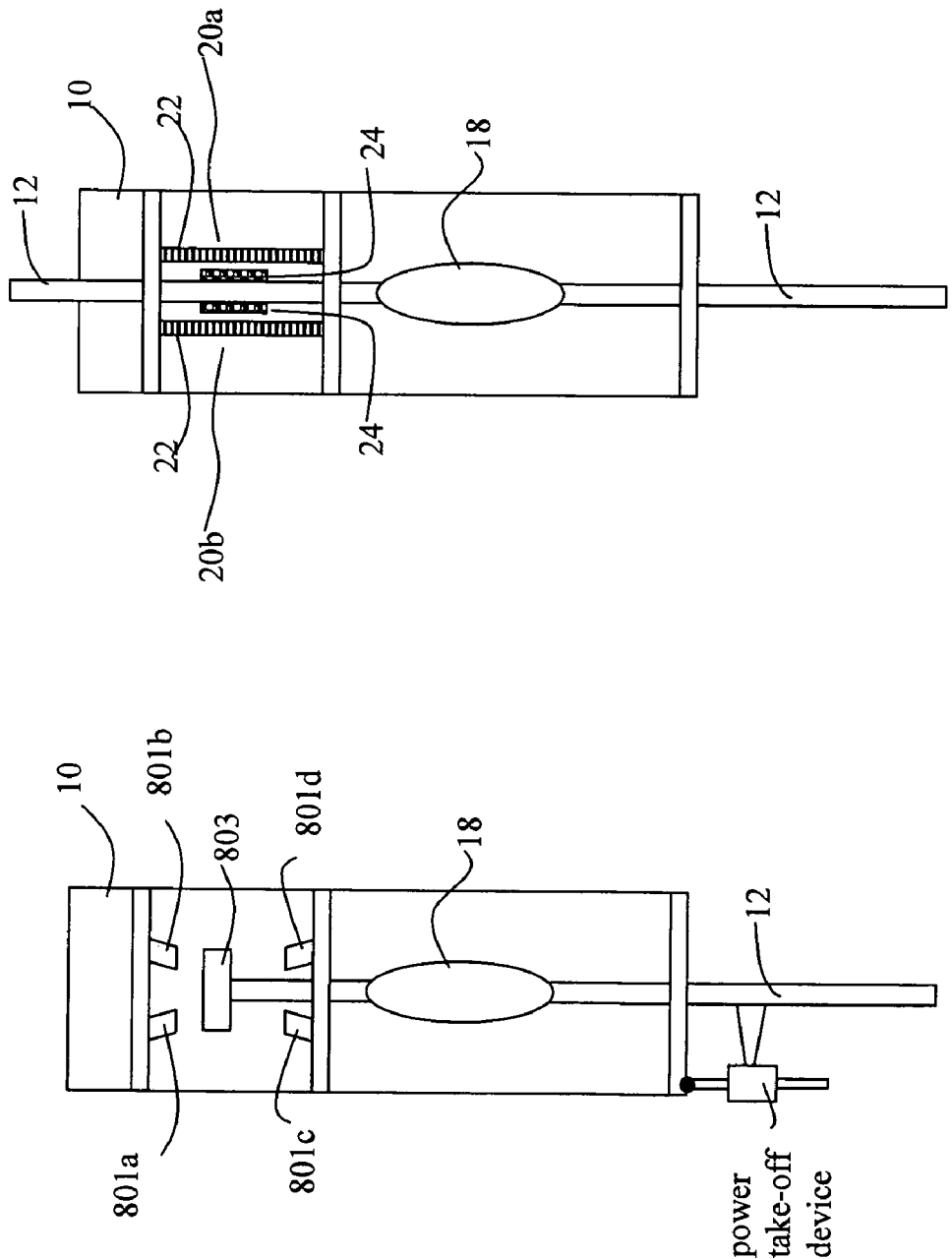

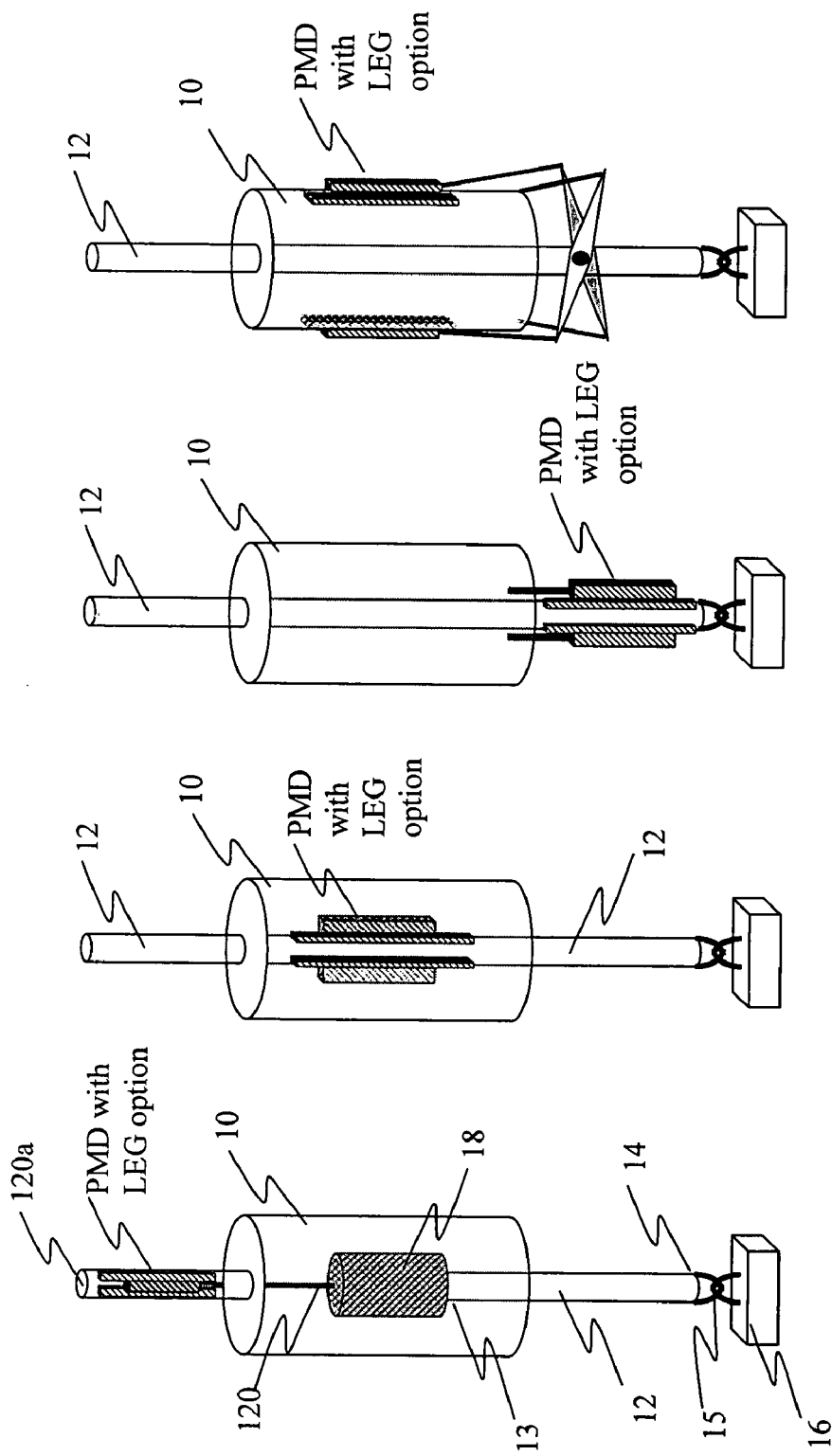

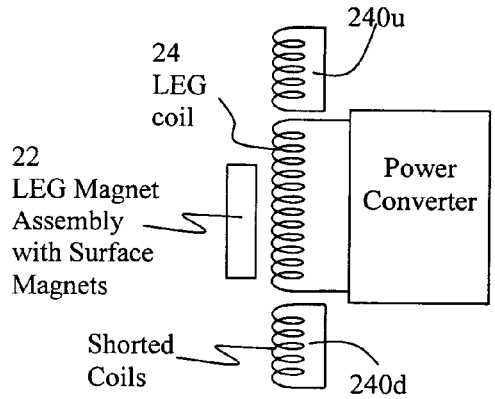
FIGURE 9A1
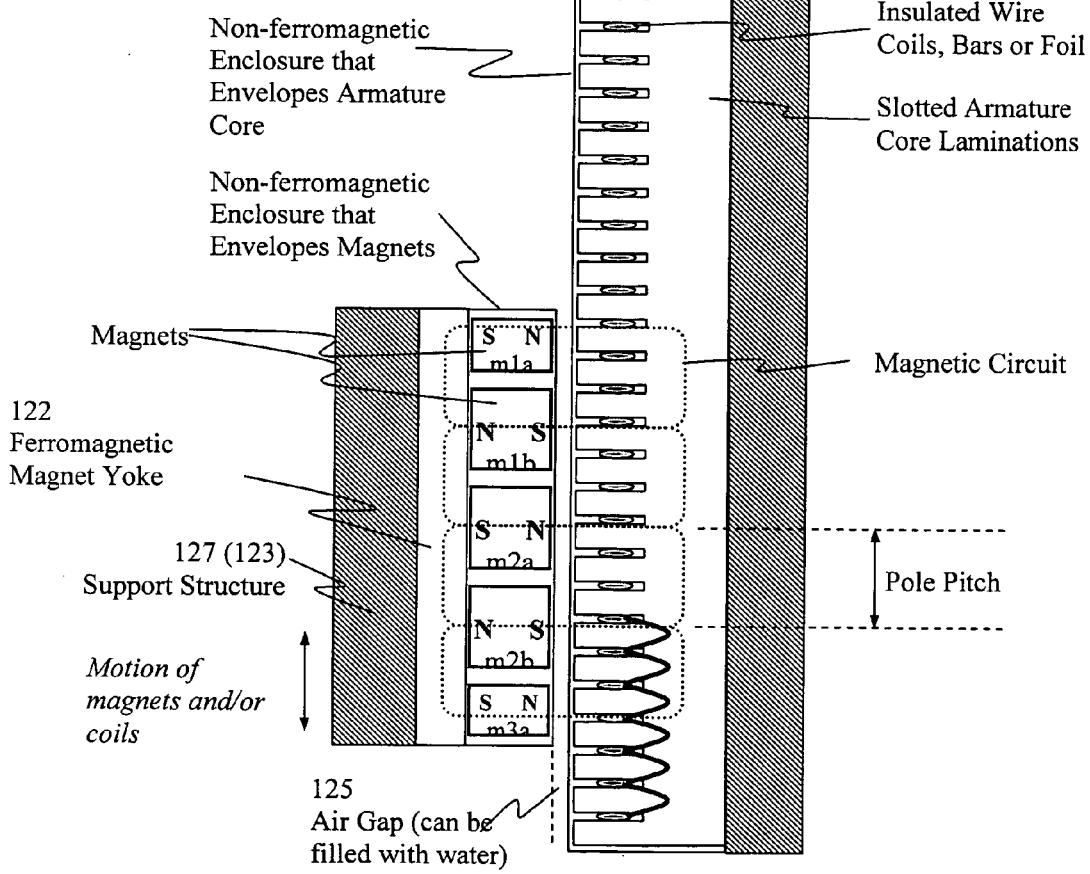
FIGURE 9A2
PMD Surface Permanent Magnet
Configuration w/ Reaction Coils

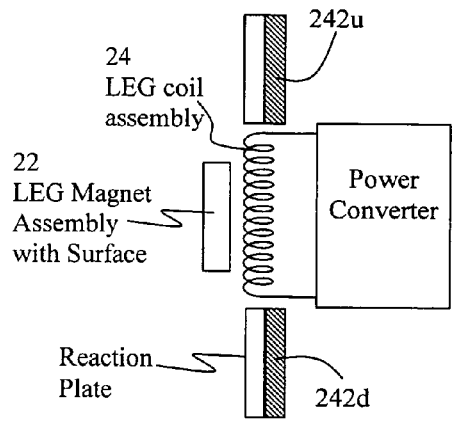
FIGURE 9B1
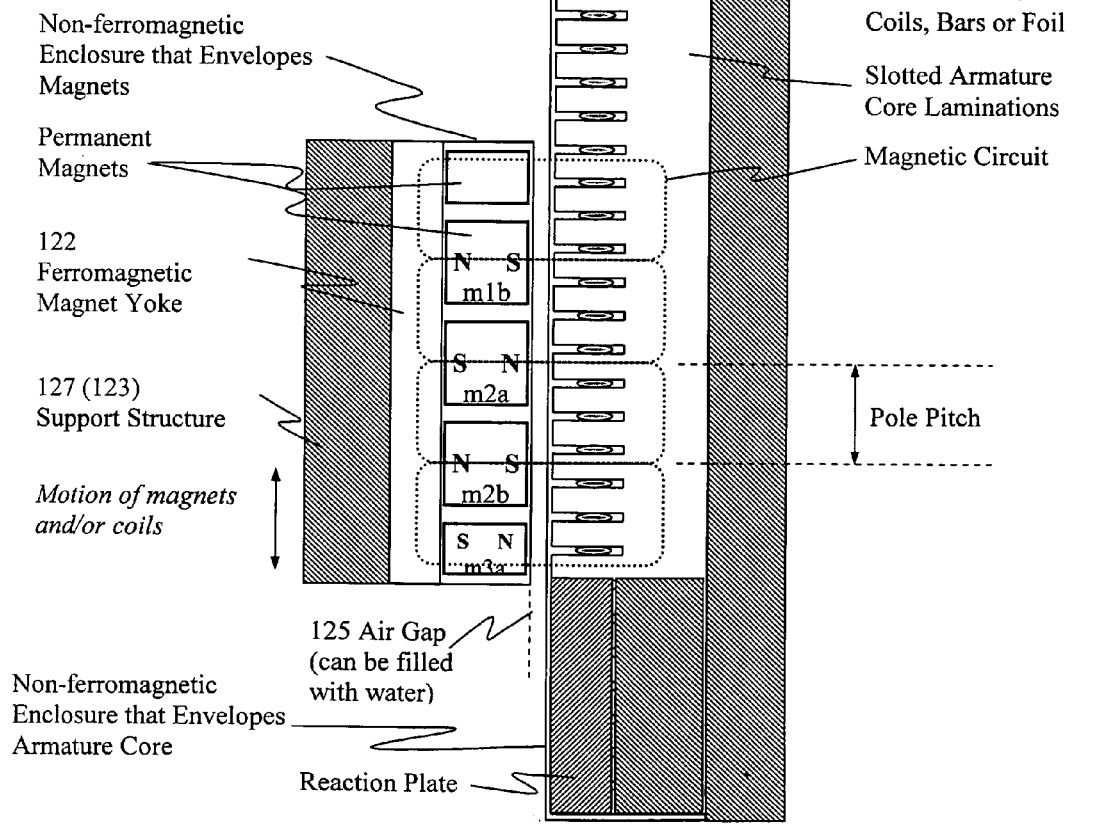
FIGURE 9B2
PMD Surface Permanent Magnet Configuration w/ Reaction Plate

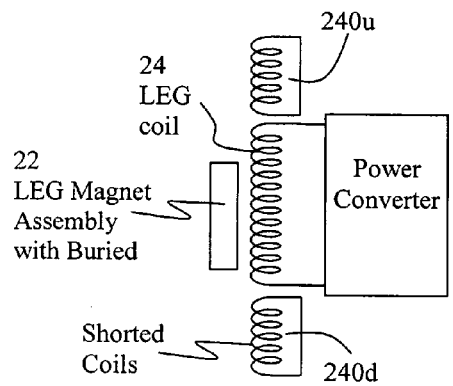
FIGURE 9C1
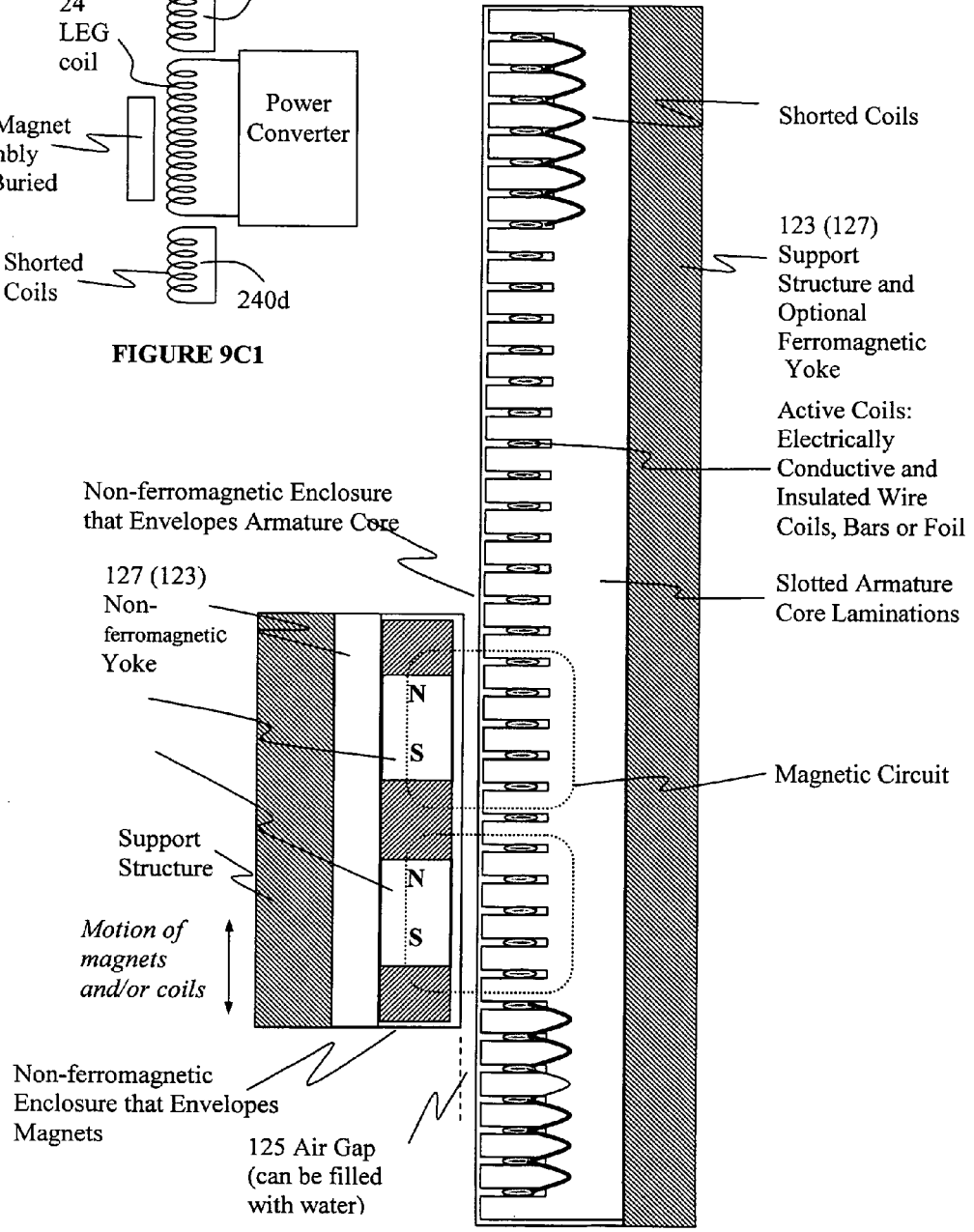
FIGURE 9C2
PMD Buried Permanent Magnet Configuration w/ Reaction Coils

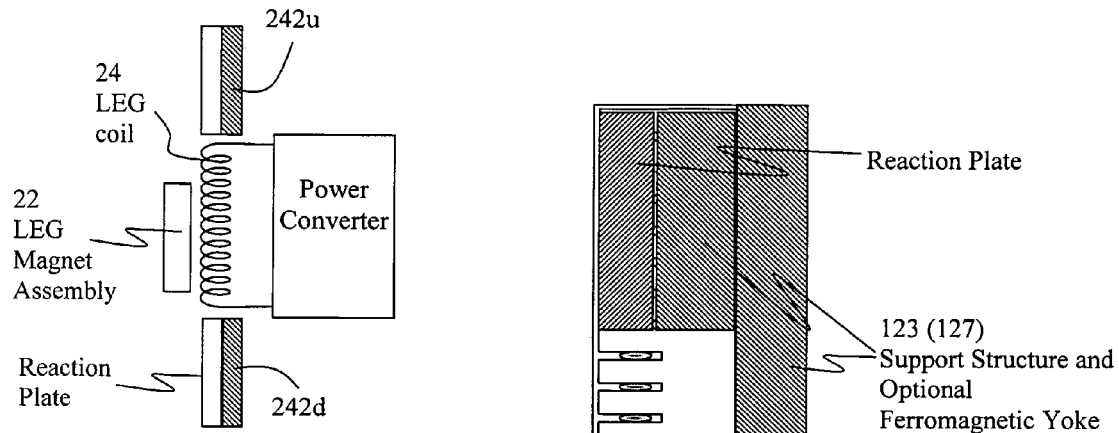
FIGURE 9D2
PMD Surface Permanent Magnet Configuration w/ Reaction Plate WEC PMD Configuration with
Moving Magnets and Stationary
Reaction Plate, Coil or Bars WEC PMD Configuration with
Moving Reaction Plate, Coil, or
Bars, and Stationary Magnets WEC PMD Moving Magnets and
Stationary Reaction Plate, Coil or Bars,
Integrated with LEG WEC PMD Moving Coil Assembly
Integrated with LEG

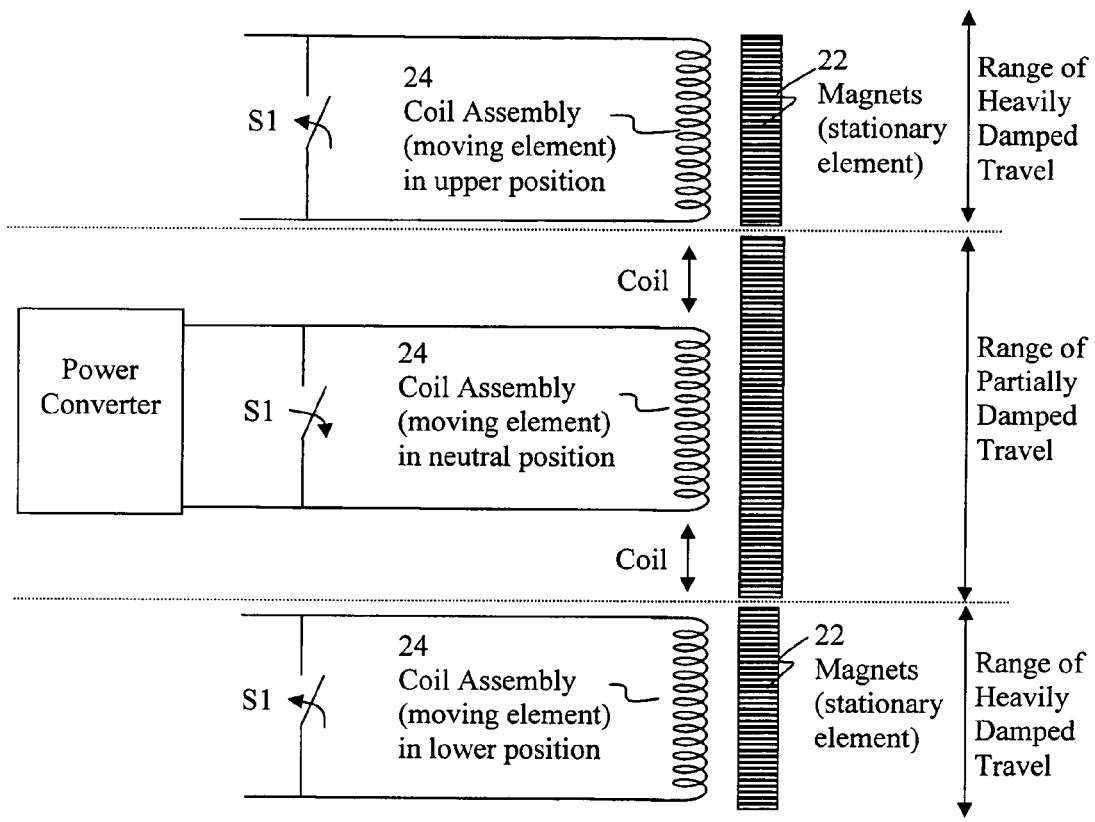
FIGURE 10D1
WEC PMD Moving Coil Assembly
Integrated with LEG

Waterproof Encapsulation with Eddy Current Losses

Waterproof Encapsulation Method to Minimize Eddy Current Losses and Maximize Magnet Flux Coupling LEG Power Conversion and Conditioning System –
Passive Rectifier Configuration LEG Power Conversion and Conditioning System –
Active Rectifier Configuration LEG Power Conversion and Conditioning System –
Bidirectional Power Flow Configuration Sample plot showing LEG output voltage and WEC shell-column differential speed versus time. Voltage is proportional to speed, magnet flux and coil configuration. Frequency is proportional to speed and pole pitch.

Sample plot showing LEG output power and WEC shell-column differential speed versus time. Instantaneous power is proportional to product of force and speed $$(P_{LEG} = F \bullet V_S)$$

WAVE ENERGY CONVERTERS (WECS) WITH LINEAR ELECTRIC GENERATORS (LEGS)

CROSS REFERENCES TO RELATED APPLICATIONS

This application claims priority from provisional patent application Ser. No. 60/553,666 titled Wave Energy Converters (WECs) with Linear Electric Generators (LEGs) filed Mar. 16, 2004, the teachings of which are incorporated herein by reference.

BACKGROUND OF THE INVENTION

This invention relates to apparatus, systems and methods for converting energy present in ocean surface waves into electric energy.

A known system for capturing ocean surface wave energy includes: (a) a first structure (which may be or interchangeably referred to herein as a "shell" or "vessel" or "float") which, when placed in a body of water, is designed to move up and down, generally, in phase with the waves in the water and thus absorb and/or release energy; (b) a second structure (which may be or interchangeably referred to herein as a "shaft", "spar", "column" or piston) which is either stationary or moves generally out of phase relative to the waves and the first structure; and (c) a mechanical or hydraulic power take-off (PTO) device coupled between the first and second structures and which in response to the relative motion between the first and second structures is designed to produce mechanical or hydraulic motion which is then converted into electrical energy.

Prior art power take-off (PTO) devices include combinations of hydraulic devices, pneumatic devices, and/or mechanical translators (e.g. rack and pinion gear system), and rotary electric generators of various types and forms (permanent magnet generator, induction generator). These devices convert the relative motion between the shell and shaft into mechanical or hydraulic motion which is then converted into electrical energy. These devices and the systems employing them tend to be inefficient, expensive to make and difficult to design for survivability.

To avoid some of these problems it has been suggested to use a linear electric generator (LEG) for a power take-off (PTO) device. However, known wave energy conversion systems utilizing linear electric generators have performance, cost, reliability and/or survivability limitations resulting from the configuration and/or the suggested type of linear electric generator. Deficiencies of existing wave energy conversion systems utilizing known linear electric generators include the following:

1. known linear electric generators have limited stroke or range of motion, limiting the amount of power that can be extracted, resulting in complex, expensive mechanical designs to limit the range of force applied to the power take-off device, and/or decreasing the survivability of the wave energy converter systems; and/or
2. in known linear electric generator systems, induction coils are an integral part of the shell or column (e.g. induction coils encircle one of the wave energy converter structural elements), resulting in complex and expensive mechanical designs; and/or
3. known linear electric generator magnet and induction coil assemblies must be housed together in a watertight enclosure, necessitating unreliable and/or expensive sealing devices at an air/water interface.

These deficiencies are overcome in systems embodying the invention.

SUMMARY OF THE INVENTION

A wave energy converter (WEC) system embodying the invention includes a power take-off (PTO) device that directly converts mechanical energy into electric energy and mitigates and/or avoids the problems listed above.

A WEC embodying the invention includes, for example, a shell and a column with a PTO device connected between the shell and the column. The shell and column are constructed such that, when placed in a body of water and in response to waves in the body of water, there is relative motion between the shell and the column. The PTO device includes a linear electric generator (LEG) system designed to produce electrical energy, directly, in response to the relative motion between the shell and the column.

The power take-off (PTO) device of the invention includes a permanent magnet (PM) assembly housed separately from an induction coil assembly which is electromagnetically coupled to the PM assembly. Each assembly may be encased in its own watertight enclosure. The power take-off (PTO) device functions as a linear electric generator (LEG) which may be also referred to as a linear synchronous generator (LSG). Typically, one of the permanent magnet and induction coil assemblies is located on, or in, or attached to, the shell and moves as the shell moves; and the other one of the permanent magnet and induction coil assemblies is located on or attached to the column and either moves as the column moves or remains stationary if the column is stationary. Relative motion between the shell and column, when placed in a body of water and in response to waves in the body of water, causes the attached (or mounted) permanent magnet and induction coil assemblies to be driven past each other, in response to motion of the waves, resulting in the generation of a voltage which is a function of the relative motion and ultimately causes a current to be generated in the coils when an external load is connected across the coils.

By way of example, when a system embodying the invention is placed in a body of water such as an ocean, passing ocean waves apply a force on a shell that is free to move up and down relative to the column (which need not be stationary; but which, for ease of explanation, is assumed to be stationary). This force results in motion of the shell relative to that of the column (e.g., a stationary element of the wave energy converter system). The PTO device, which includes a linear electric generator coupled between the shell and the column develops a force which is "typically" opposite (counter) to that applied by the passing wave. In systems embodying the invention, a guide and bearing system may maintain the relative alignment of the magnet and induction coil assemblies and the space between them.

In a WEC embodying the invention, permanent magnet assemblies and induction coil assemblies, housed in separate enclosures, can be placed in numerous different locations in, or on, the WEC. The magnet and induction coil assemblies are not an integral part of the wave energy converter mechanical structure. They may be placed so as to provide the most efficient power conversion and/or to optimize the design of the shell and column, including design simplicity, ease of installation and servicing.

In accordance with the invention, the magnet and induction coil assemblies do not need to be housed in a common enclosure and therefore do not require watertight seals for such an enclosure.

Another advantage of the separately enclosed magnet and induction coil assemblies is that the stroke of the system (for most embodiments) is limited only by the length of the bearing and alignment system. The bearing and alignment system can be made sufficiently long so as to avoid the constraining of the range of motion of the moving shell, thus minimizing impact loads and structure design to survive these impact loads.

A LEG located between the shell and the central column may be used to provide braking, or damping, action between the shell and the column when the travel of the shell relative to the column exceeds a predetermined distance.

Due to the forces of the waves there tends to be twisting and turning (rotation) of the shell relative to the column when the WEC is in the water. An anti-rotational scheme includes the formation of a multi-sided central column (e.g., a square) surrounded by the inner wall of the shell shaped to have a complementary structure whereby the shell cannot rotate relative to the column. This scheme includes the formation of many parallel surfaces between the inner wall of the shell and the sides of the central column. LEG assemblies can then be more easily formed between the parallel surfaces and their dimensions can be maintained to ensure good and efficient coupling.

It is also important to package the magnetic and induction coil assemblies such that the magnetic flux coupling between these assemblies is maximized and the eddy current losses are reduced in order to obtain an increase in the efficiency of the electric power production.

BRIEF DESCRIPTION OF THE DRAWINGS

In the accompanying drawings like reference characters denote like components; and FIG. 1A is an illustrative diagram (not to scale) showing the installation of a linear electric generator (LEG) assembly above the shell of a WEC, in accordance with the invention;

FIGS. 1A1 and 1A2 illustrate in more detail the location of a permanent magnet assembly and an induction coil assembly in the structure of FIG. 1A;

FIG. 1B is a diagram (not to scale) showing the installation of a LEG assembly inside the shell of a WEC, in accordance with the invention;

FIGS. 1B1 and 1B2 are cross-sectional views of a LEG assembly mounted on a square column; the square column being designed to provide anti-rotation (i.e., to prevent rotation of the shell relative to the column) while simultaneously providing parallel surfaces between the shell and the column to enable the formation of a more efficient LEG;

FIG. 1C is a diagram (not to scale) showing the installation of a LEG below the shell of a WEC, in accordance with the invention;

FIGS. 1C1 and 1C2 are diagrams illustrating, in more detail, alternate locations of a permanent magnet assembly and an induction coil assembly in the structure of FIG. 1C;

FIG. 1C3 is a side view illustrating a coil assembly moving across a permanent magnet assembly, in accordance with the invention;

FIG. 1D is a diagram (not to scale) showing the installation of a permanent magnet assembly and the induction coil assembly of a LEG on the outside of the shell of a WEC with means for providing velocity multiplication, in accordance with the invention;

FIG. 1D1 is a more detailed diagram (not to scale) of the system of FIG. 1D illustrating velocity multiplication;

FIG. 1D2 is a diagram (not to scale) of the system of FIG. 1D illustrating velocity multiplication with the LEG positioned on the inside wall of the WEC shell;

FIG. 1D3 is another diagram (not to scale) of the system of FIG. 1D illustrating velocity multiplication with the electromagnetic coils of a LEG installed along the outside wall of the WEC shell and the permanent magnet passing along the outside of the coils;

FIGS. 1D4, 1D5 and 1D6 illustrate variations of the invention;

FIGS. 4C and 4C1, 4C2, 4C3 and 4C4 are illustrative diagrams of apparatus for establishing and maintaining a fixed gap between the coils and the permanent magnets of a LEG used to practice the invention;

FIG. 5 shows a three phase linear electric generator coil configuration for use in practicing the invention;

FIG. 8 is an illustrative diagram of a prior art braking/damping arrangement using mechanical means to limit the length of travel of the shell and shaft of a WEC;

FIGS. 8A through 8D are illustrative diagrams (corresponding to FIGS. 1A through 1D) showing the use of the LEG of the invention to provide braking (also referred to as "damping") when the vertical displacement between the shell and the column of the WEC exceeds predetermined values;

FIG. 8E is an illustrative diagram of a WEC system embodying the invention;

FIGS. 9A1, 9B1, 9C1, and 9D1 are schematic diagrams illustrating the use of LEGs to provide braking or damping, in accordance with the invention;

FIGS. 9A2, 9B2, 9C2 and 9D2 are illustrative diagrams of structures which may be used to provide electromagnetic damping (braking) in accordance with the invention;

FIG. 10D1 illustrates the use of coil switching for selectively shorting the coil as it travels through different regions of travel;

DETAILED DESCRIPTION OF THE INVENTION

Figures 6A, 6B, 6C:
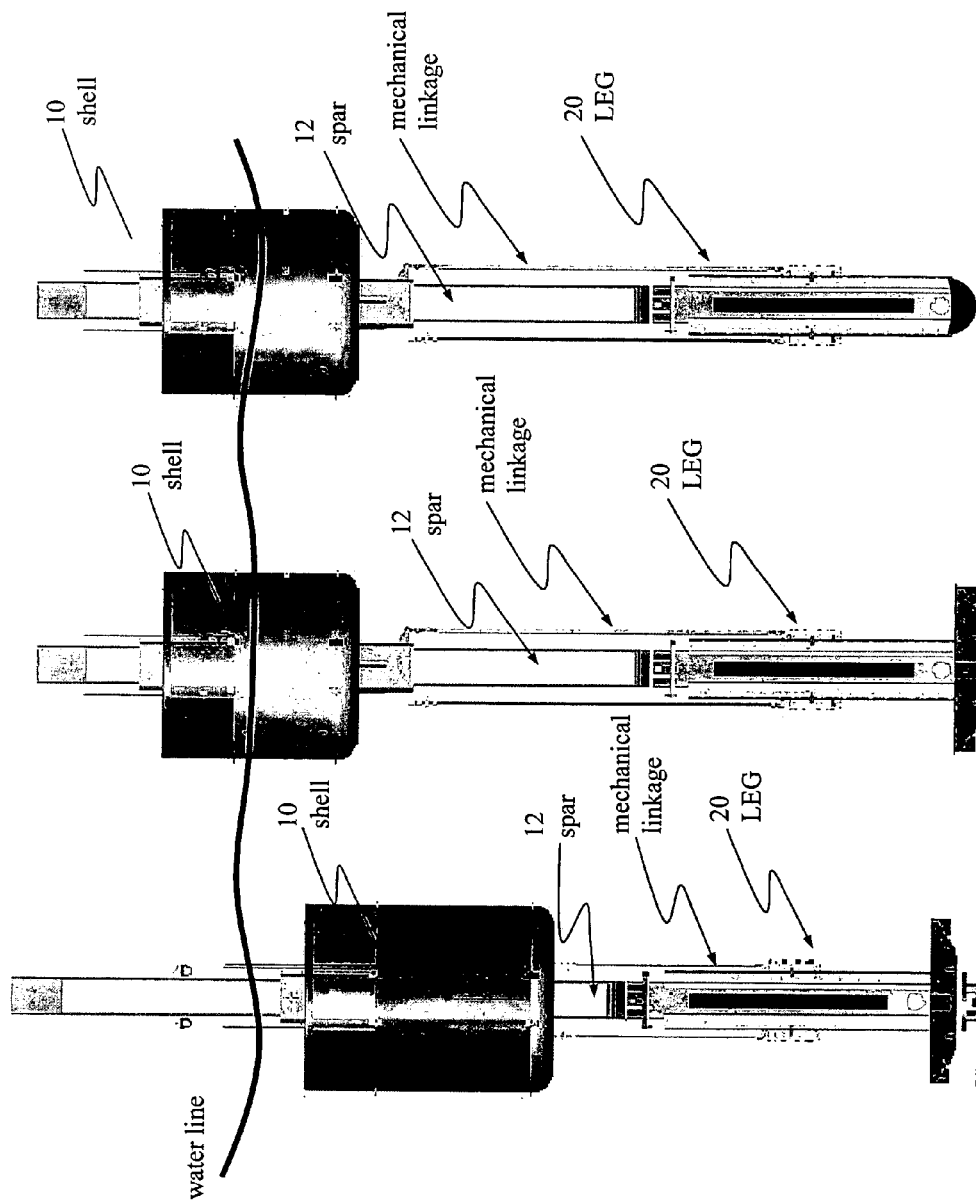
FIGS. 6A, 6B AND 6C depict various WECs for use in practicing the invention.

I. Systems Suitable for Practicing the Invention;

Wave energy converters (WECs) suitable for practicing the invention may include systems of the type shown in FIGS. 6A, 6B, and 6C. FIG. 6A shows a neutrally buoyant shell 10 typically submerged below the surface of the ocean with a tethered or anchored vertical column (spar) 12. FIG. 6B shows a buoyant shell typically floating at the surface of the ocean also with a tethered or anchored vertical column (spar) 12. FIG. 6C illustrates a dual wave energy absorber where the shell 10 and the spar 12 move relative to each other, the shell generally in phase with the waves and the spar tending to move out of phase with the shell and/or the ocean waves. Each one of the WECs shown in FIGS. 6A, 6B and 6C may include one, or more, power take off (PTO) which includes a linear electric generator (LEG) device 20 connected between the "shell" and the "spar".

In general, any WEC which includes first and second structures (e.g., a shell and a spar) which, in response to forces such as those produced by ocean waves, move relative to each other may be suitable for practicing the invention. In accordance with the invention, a PTO, which includes a linear electric generator (LEG) 20, may be coupled between the first and second structures to convert their relative motion into electrical energy directly. Furthermore, in accordance with the invention, the PTO may be placed in many different locations, providing a high degree of freedom in the design of the physical configuration of the system.

Linear Electric Generator (LEG)

A linear electric generator (LEG) is proposed as the WECs power take-off (PTO) device for a number of reasons. The projected efficiency of the all-electric system is estimated to be above 90% at rated force and velocity. This efficiency is well above the less than 80% efficiency of the existing hydraulic-electric system. The hydraulic components are also expensive, have limited life and reliability, and present installation and maintenance challenges. The elimination of the hydraulic components is an important reason for using LEGs.

A significant benefit of the LEG is that it enables implementation of significant improvement in efficiency and survivability features. One aspect of the invention is that it enables implementing an active impedance matching system (AIMS) which includes feeding back power to the buoy (WEC) during a portion of each wave cycle. It has been found that using a hydraulic system for feed back is not possible on a long-term basis. The life of a hydraulic motor, when operated as a pump, is shortened significantly. The LEG, on the other hand, can be operated as a motor and/or as a generator, depending on the direction of current flow and applied mechanical force. Thus, the LEG enables active impedance matching, with a resultant increase in WEC efficiency.

A LEG can also be configured with essentially unlimited stroke. This feature has enormous benefit in terms of WEC structural design and survivability. In existing WEC designs, the impact forces, not the wave forces, control the structural design. Also existing WECs have limited stroke, driven by the finite length of the hydraulic cylinder or other mechanical PTO devices, which requires a mechanical system with end stops and dampers to absorb the impact loads. The anchor, universal joint, and column must also be designed to handle these loads. In a system embodying the invention, without these end stops, the force on the structural components is limited to that exerted by the power take-off device (the LEG in this case). With the addition of copper or aluminum plates at the end of normal power take-off stroke, passive damping (braking) can be implemented. This damping serves to take energy out of the buoy in storm conditions. Thus, the structural design of a WEC using LEG systems is greatly simplified.

Advantages of using linear electric generators (LEGs):
1—eliminate hydraulics or other mechanical translation devices—this should result in significant gain in efficiency since there are substantial power (efficiency) losses associated with hydraulic and mechanical translation conversion systems.
2—the life-cycle cost of LEG systems should be cheaper than hydraulic pump/generator systems.
3—LEG gain in efficiency more reliable than hydraulic systems.
4—LEG systems allow for bi-directional power flow operation II. Configurations of Systems Using a Leg for Power Take Off The WECs shown in FIGS. 6A, 6B and 6C may incorporate LEG assemblies as shown in FIGS. 1A through 1H. Certain aspects of the invention may be described with reference to the drawings. The WECs are intended to be placed in a body of water (e.g., an ocean) and the waves cause the shell 10 to move up and down relative to the central column (piston or spar) 12. That is, the up and down motion of ocean waves applies a force to the shell 10, causing up and down motion of the shell relative to the spar 12 which may be a stationary member of the wave energy converter system. Alternatively, the spar 12 may also be a moving member, but whose movement tends to be out of phase with the motion of the shell. In FIGS. 1A-1D, the spar 12 is shown anchored and to be stationary with the shell 10 moving up and down. In FIGS. 1E-1H, the shell 10 and the spar 12 may both move relative to each other, with the shell tending to move, generally, in a direction opposite to the spar.

FIGS. 1A, 1B, 1C and 1D show four different configurations of wave energy converters (WECs) utilizing linear electric generator (LEG) assemblies 20. The LEG assemblies 20 normally include a permanent magnet (PM) assembly 22 and an induction coil assembly, 24. In accordance with the invention, the permanent magnet assembly (PMA) 22 and the induction coil assembly (ICA) 24 need not be encased in a common sealed housing. Separately enclosed magnet and induction coil assemblies provide options not possible with known common-housing linear electric machines. As shown in FIGS. 1A-1D, the LEG assemblies can be placed above, below, on the inside or on the outside of a wave energy converter shell. In FIG. 1A, the LEG assembly 20 is mounted above the shell 10. In FIG. 1B, the LEG assembly is mounted within (inside) the shell 10. In FIG. 1C, the LEG assembly 20 is mounted below the shell 10. Also, in FIG. 1C1, the permanent magnet assembly 22 is affixed to the column 12 of the WEC and the induction coil assembly 24 is coupled to the shell. In FIG. 1C2, the permanent magnets 22 are mechanically coupled to the shell 10 of the WEC and the induction coil assemblies 24 are affixed to the column 12.

In FIG. 1D, the LEG assembly 20 is mounted on the outside of the shell 10. In FIG. 1A, and as detailed in FIGS. 1A1 and 1A2, the LEG 20 is situated in a mast column extending above the WEC shell 10. The WEC includes a shell 10 and an articulated (pivoted) central column (spar) 12 having a top end 13 and a bottom end 14. The spar 12 is shown connected at its bottom end 14 via a universal joint 15 to an anchor 16 designed to hold the spar 12 stationary. The spar is connected at its top end 13 to a column float 18. Extending upward from the spar 12 and the float 18 is a mechanical linkage, or "push-rod", 120 which functions to hold one of the LEG magnetic assembly and the induction coil assembly steady while the shell and the mast to which is attached the other one of the LEG magnetic assembly and the induction coil assembly move up and down. On the portion 120a of push-rod 120 extending above the top 101 of shell 10 there is mounted one portion of the linear electric generator with the other portion being held or secured from, or to, the inside wall of the masthead. The ICA and PMA assemblies (24, 22) are positioned relative to each other so that there is a small gap between them to ensure strong electromagnetic coupling between the coils and the magnets while allowing "unimpeded" physical linear (vertical) motion relative to each other. That is, relative movement is unimpeded except for the forces exerted due to the desired power generation and power extraction.

Figures 1E, 1F, 1G, 1H:
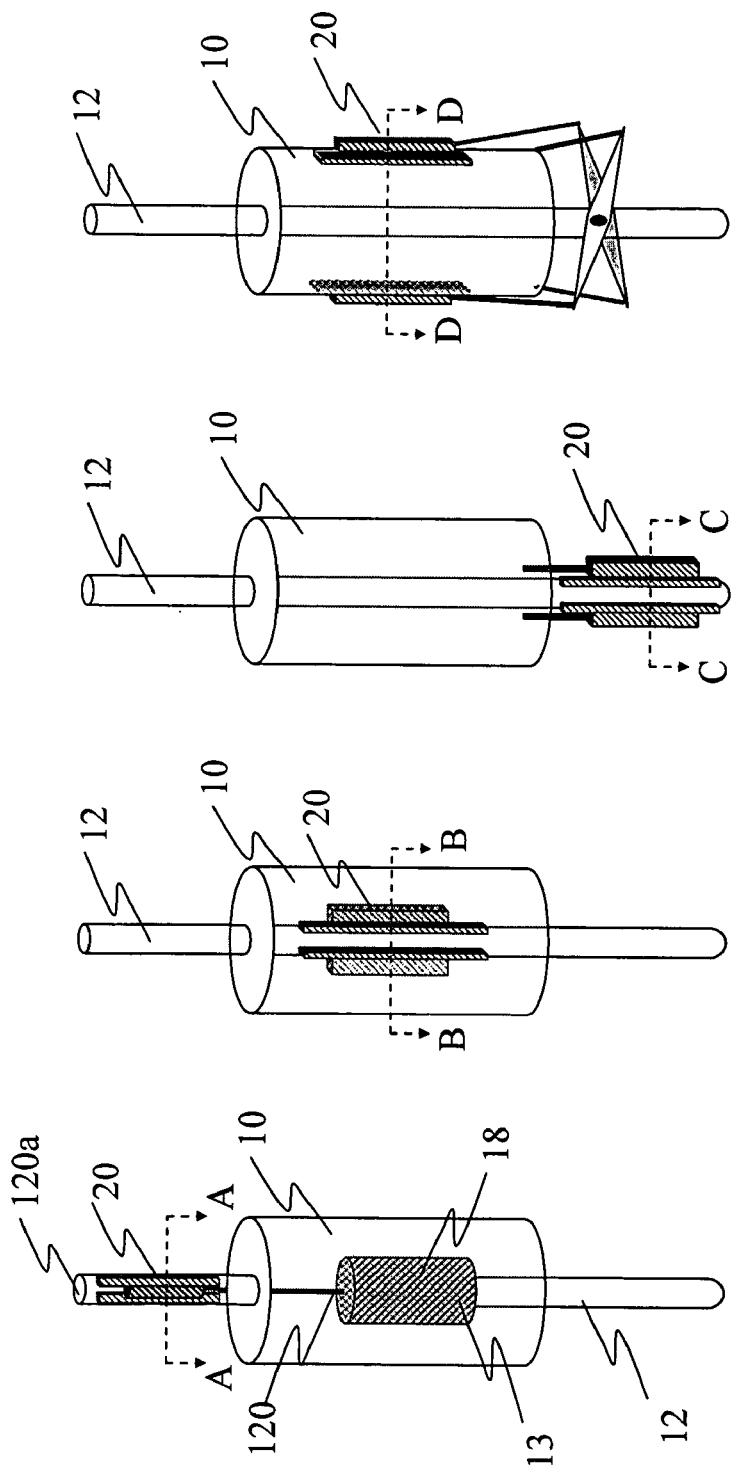
FIGS. 1E through 1H are illustrative diagrams (not to scale) of embodiments of the invention in which the shell (float) moves generally in phase with the waves and the column or shaft is untethered and can move generally out of phase with the motion of the waves with a LEG assembly connected so as to be moved by the shell and column.

In FIG. 1A1, the magnetic assembly 22 is secured to the push rod 120a (which may be tethered and stationary or untethered and move generally out of phase with the shell) and the induction coil assembly 24 is physically mounted along the inner wall of the masthead so as to move up and down as the shell 10 moves up and down. In FIG. 1A2, the coil assembly 24 is secured to the push rod 120a, which is assumed to be stationary, and the permanent magnet assembly 22 is physically mounted so as to move up and down as the shell 10 moves up and down. Thus, either the coils move relative to the magnets as in FIG. 1A1 or the magnets move relative to the coils as in FIG. 1A2. In either configuration there is relative movement between the coils and the magnets as the shell moves up and down. Note that, alternatively, the coils and the magnets can move relative to each other as illustrated in FIGS. 1E-1H.

In FIG. 1B, the LEG is located inside the WEC shell. In this embodiment, the shell and LEG bearing assemblies may (or may not) be integrated. In this configuration twisting between the internal walls of the shell and the central column 12 may be more pronounced and adversely affect the operation of the LEG.

In general, a problem exists in that there are twisting and turning forces between the shell 10 and the central column 12 tending to cause the shell to rotate relative to the column (or vice-versa). A solution to the problem as shown in FIGS. 1B1 and 1B2 is to make the shape of the central column 12 such that it has a multiplicity of sides (e.g., three or more sides) with the column mounted through the center of the shell and the inner wall or core section of the shell having a complementary structure to the sides of the column. The inner walls 110 of the shell 10 may be formed with parallel surfaces to the outer walls or sides of the column. FIGS. 1B1 and 1B2 show the cross section of the inner wall 110 of the shell 10 to be square shaped in a complementary fashion to the square shape of the central column 12. For this "anti-rotational" type of design the tendency of the shell to rotate relative to the column has been significantly reduced, if not eliminated. Also, parallel and opposite surfaces are formed which make it easier to locate and hold LEG assemblies. The induction coil assembly 24 can be mounted on one of the outer side(s) of the column 12 and the inner wall(s) 110 of the shell and the permanent magnetic assembly can be mounted on the other one of the outer side(s) of the column 12 and the inner wall(s) 110 of the shell. As further discussed below, forming the LEG assemblies along parallel surfaces aids in the forming of LEG assemblies whose dimensions and motions are easier to control resulting in a more reliable and more efficient LEG.

FIG. 1B1 shows one high-force, high-power LEG cross-section. The unit includes four LEG assemblies, each with a moving permanent magnet assembly 22 and a stationary stator induction coil assembly 24. The LEG is configured in a box configuration for two reasons. First, the large magnet-stator attractive force is somewhat negated if the magnets are held apart by a support structure. Second, the overall length of the quad-LEG may be made one-fourth the length of a single LEG. Other configurations may be considered. For example, the LEG may be implemented as one or more back-to-back magnet-stator assemblies, as shown in FIG. 1B2.

In FIG. 1C, the LEG 20 is located below the shell 10. In this configuration the LEG assembly is de-coupled from the bending and torsional loads of the WEC shell as compared to the system of FIG. 1B. This approach enables extended stroke with a relatively simple mechanical design. This configuration also facilitates installation and servicing, and decouples the LEG assembly(s) from bending and twisting mechanical loads associated with the shell.

A somewhat more detailed view of two different possible configurations of the LEG 20 of FIG. 1C are shown in FIGS. 1C1 and 1C2. In FIG. 1C1, the permanent magnet assembly 22 is shown located along the shaft 12, (which is assumed to be, but need not be) stationary, while the ICA 24 is connected at one end to the shell 10 and moves up and down across the PMA 22, as the shell 10 moves up and down relative to the shaft 12. Note that an air gap (it could be a liquid gap) is maintained between the two assemblies, 22 and 24. In FIG. 1C2, the ICA 24 is shown located along the shaft 12 (which is assumed to be, but need not be, stationary), while the PMA 22 is connected at one end to the shell 10 and moves up and down across the ICA 24, as the shell 10 moves up and down relative to the shaft 12. Note that FIG. 1C3 shows a side view of the ICA 24 being propelled by the shell 10 across the PMA 22. In the implementation shown in FIG. 1C1, the magnetic assembly 22 is mounted on the lower portion of the column 12 which is secured to the ocean floor in a manner such that vertical motion is constrained, yet lateral motion is permitted. Several permanent magnetic and induction coil assemblies may be located around the lower column (which may be a cylinder, or any multi-sided structure).

In all the configurations shown in this application, wave action forces the shell to move up and down, causing relative motion between the induction coils and the permanent magnets. Note that the coil and magnetic assemblies are designed to pass each other with the small "gap" between the assemblies being maintained relatively constant to ensure good electromagnetic coupling at all times. In this way, mechanical force and motion are converted to electrical current and voltage in an efficient manner.

FIG. 1D shows that a plurality of different LEG (e.g., 20a, 20b) assemblies may be placed on the outside of the WEC shell. In FIG. 1D one part of the LEG (e.g., one of the permanent magnetic and induction coil assemblies) is mounted along the external wall of the shell 10 and the other part of the LEG (e.g., the other one of the magnetic and coil assemblies) is mounted to pass by, and opposite, the first part. Note that several link (radius) arms 920a, 920b are coupled to column 12 via a pivot point 901. Each link arm (920a, 920b) is connected at one end to the shell 10 and at its other end to a part of the LEG, to cause motion between the coil and magnetic assemblies movement in response to movement of the shell. A desirable feature of this design is that the relative stator-magnet velocity may be increased substantially for producing greater electric output. As a result, the LEG force requirement and size can be halved. A disadvantage of this approach is the limited stroke that can be achieved.

The configurations shown in FIGS. 1A, 1C and 1D have an advantage in that bending and twisting loads of the shell are de-coupled from the LEG assemblies. The configurations shown in FIGS. 1A, 1B and 1C have an advantage in that the stroke can be made longer than the range of motion of the shell, to avoid impact loads and resulting mechanical design issues. Each one of FIGS. 1A-1D shows two LEG magnet/coil assemblies, but it should be evident that systems embodying the invention can be configured with either one or multi-LEG assemblies operating at the same time.

Figure 2A:
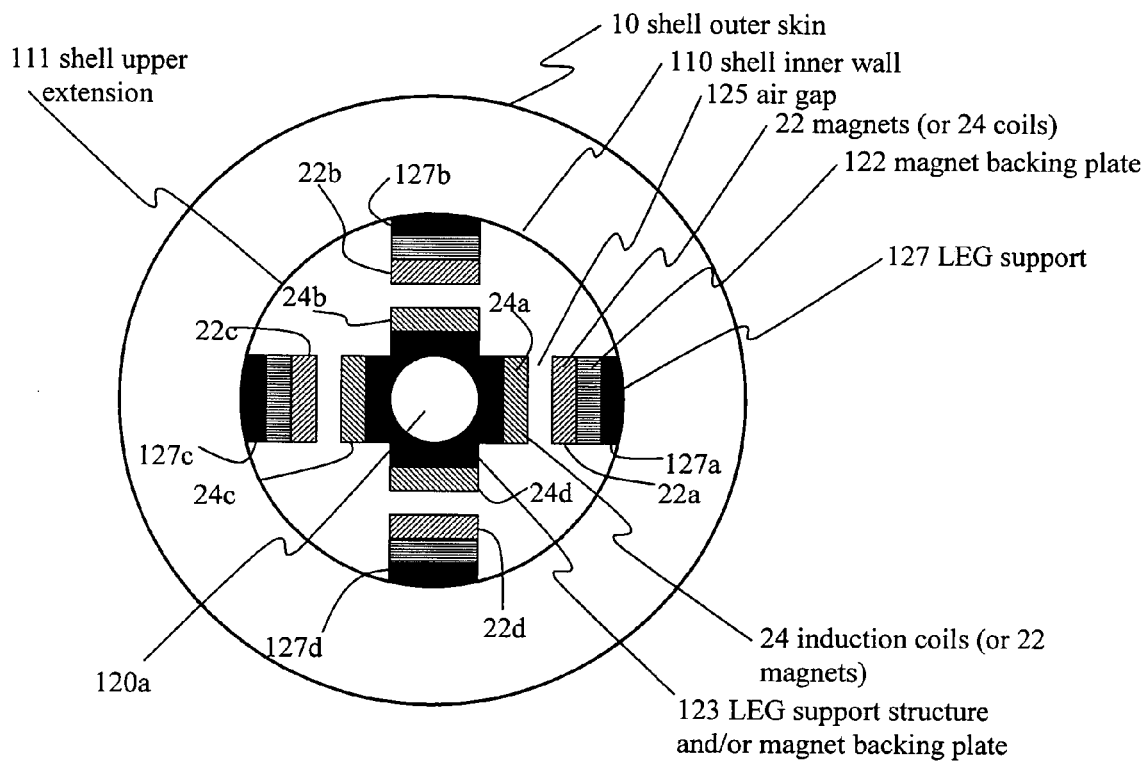
FIG. 2A is a cross-section diagram of part of the WEC and the power take-off (PTO) device of FIG. 1A.

Portions of the structure of the LEGs outlined in FIGS. 1A-1D are presented in a little more detail in FIGS. 2A-2D. FIGS. 2A, 2B, 2C, and 2D show cross-sectional views of LEGs which may be used in the WECs shown in FIGS. 1A, 1B, 1C and 1D and how the assemblies may be mounted on or within a WEC. In each one of these figures there is shown numerous LEG assemblies. Each configuration may include one, or more than one, LEG assembly. FIG. 2A shows pushrod 120a with a LEG support structure 123 on four sides of the pushrod. The LEG support 123 provides the structure to hold induction coil assemblies 24a, 24b, 24c, 24d. Separated therefrom by air gap 125, and corresponding to each coil assembly there is a magnetic assembly 22a, 22b, 22c, 22d. Each magnetic assembly is shown mounted on a magnetic backing plate which in turn is mounted on a LEG support 127a, b, c, d which is connected to the inner shell 111 of the shell or the masthead.

Figure 2B:
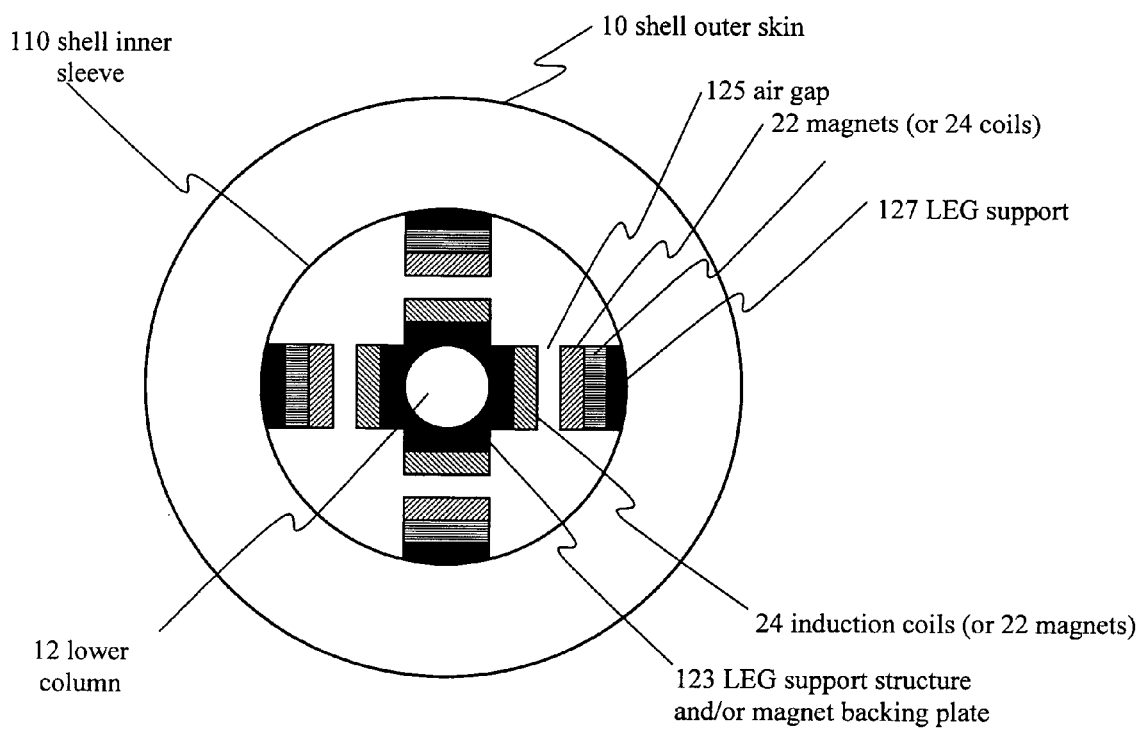
FIG. 2B is a cross-section diagram of part of the WEC and PTO device of FIG. 1B.

FIG. 2B is similar to FIG. 2A with the LEG being mounted between the column 12 and the inner wall 110 of the shell 10, corresponding to the WEC structure of FIGS. 1B and 1F.

Figure 2C:
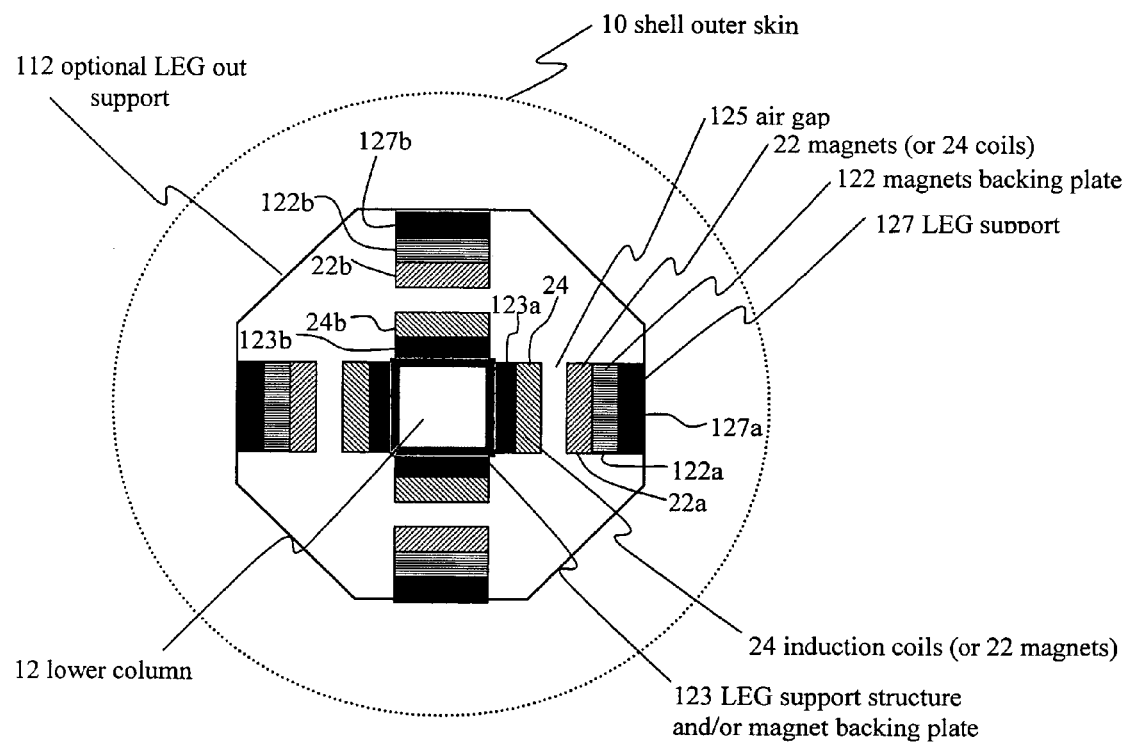
FIG. 2C is a cross-section diagram illustrating that, in the WEC structures shown in FIGS. 1A-1H, the central column may be multi-sided (e.g., a square column having 4 sides), with the inner wall of the shell having a facet parallel to each side of the central column and with a LEG assembly located between each side of the central column and a corresponding facet of the inner shell wall.

FIG. 2C shows a cross section of four LEG assemblies which may be used with the WEC of FIG. 1C or 1G (or with any of the other WECs). In accordance with FIGS. 1C and 2C, the lower portion of central column 12 (and also the entire column) would be shaped as a square column. Connected or mounted to each of the 4 sides of the column 12 is a LEG support assembly 123 with a coil assembly 24 mounted on each LEG support 123. Opposite each coil assembly there is located a magnetic assembly 22 separated from the coil assembly by an air gap 125. Each magnetic assembly is mounted on a magnet backing plate 122 which is attached to a LEG support 127. The individual LEG supports 127 may be interconnected with an optional LEG out support 112 (shown of octagonal shape in FIG. 2C, but which may be any other shape) to contain the leg assemblies.

Figure 2D:
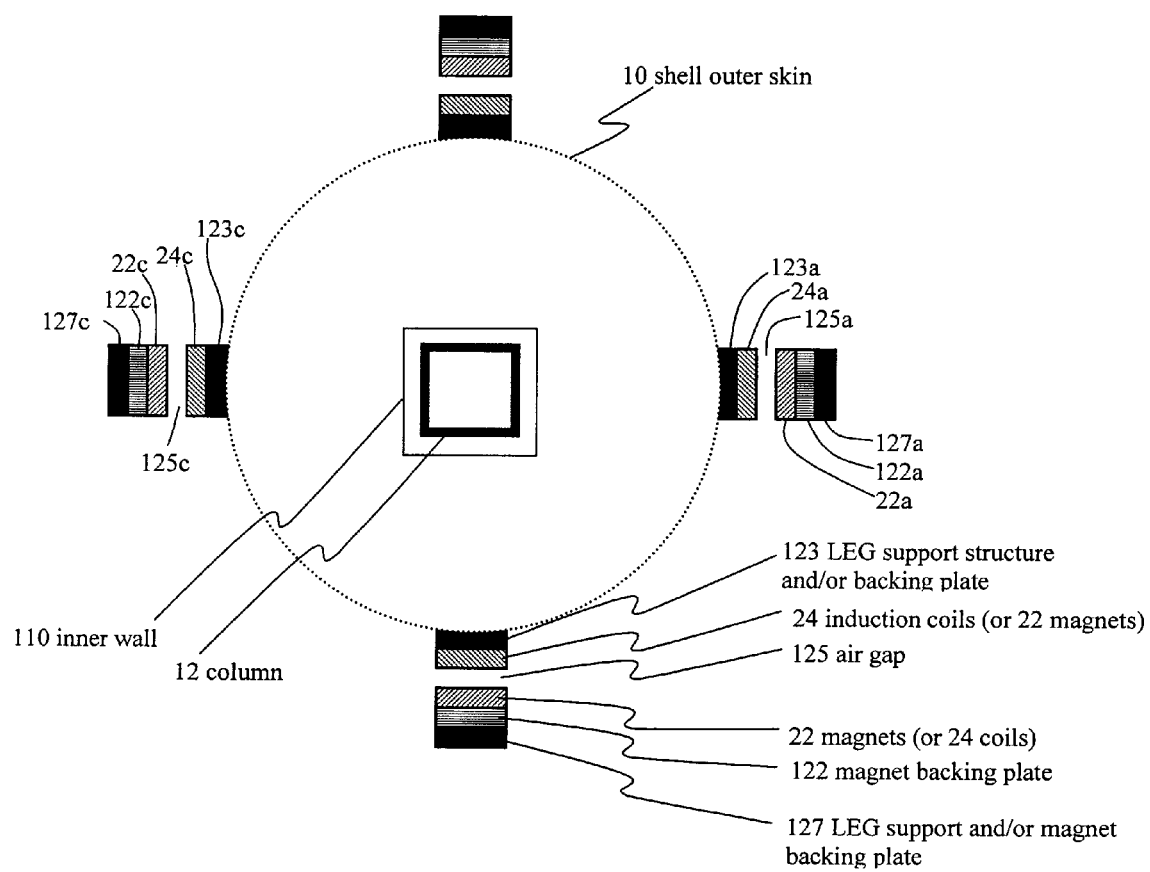
FIG. 2D is a cross-section diagram of part of the WEC and PTO device of FIG. 1D.

FIG. 2D shows a cross section of four LEG assemblies which may be used with the WEC of FIG. 1D or 1H and those shown in FIGS. 1D1, 1D3, 1D4, 1D5 (or with any of the other WECs). In accordance with FIGS. 1D and 2D, the inner column (shaft) 12 may be a square column and the inner wall 110 of the shell 10 may also form a square column surrounding the column 12 for preventing rotation of the shell relative to the column. FIG. 2D shows 4 LEG assemblies mounted on the outside wall of the shell. Each LEG assembly, as in the other figures, includes a LEG support 123, a coil assembly 24 mounted on support 123, an air gap, a magnetic assembly 22, a magnetic support plate 122 and a LEG support plate 127. The PMA 22 and its support are connected to a connecting arm 923 to cause the assembly to move in the opposite direction to the motion of the shell as shown in FIGS. 1D, 1H and in FIGS. 1D1, 1D3, 1D4, 1D5. Note that, in general, the location and mounting of the ICA 24 and the PMA 22 may be interchanged, as already discussed.

Figures 3A, 3B, 3C, 3D:
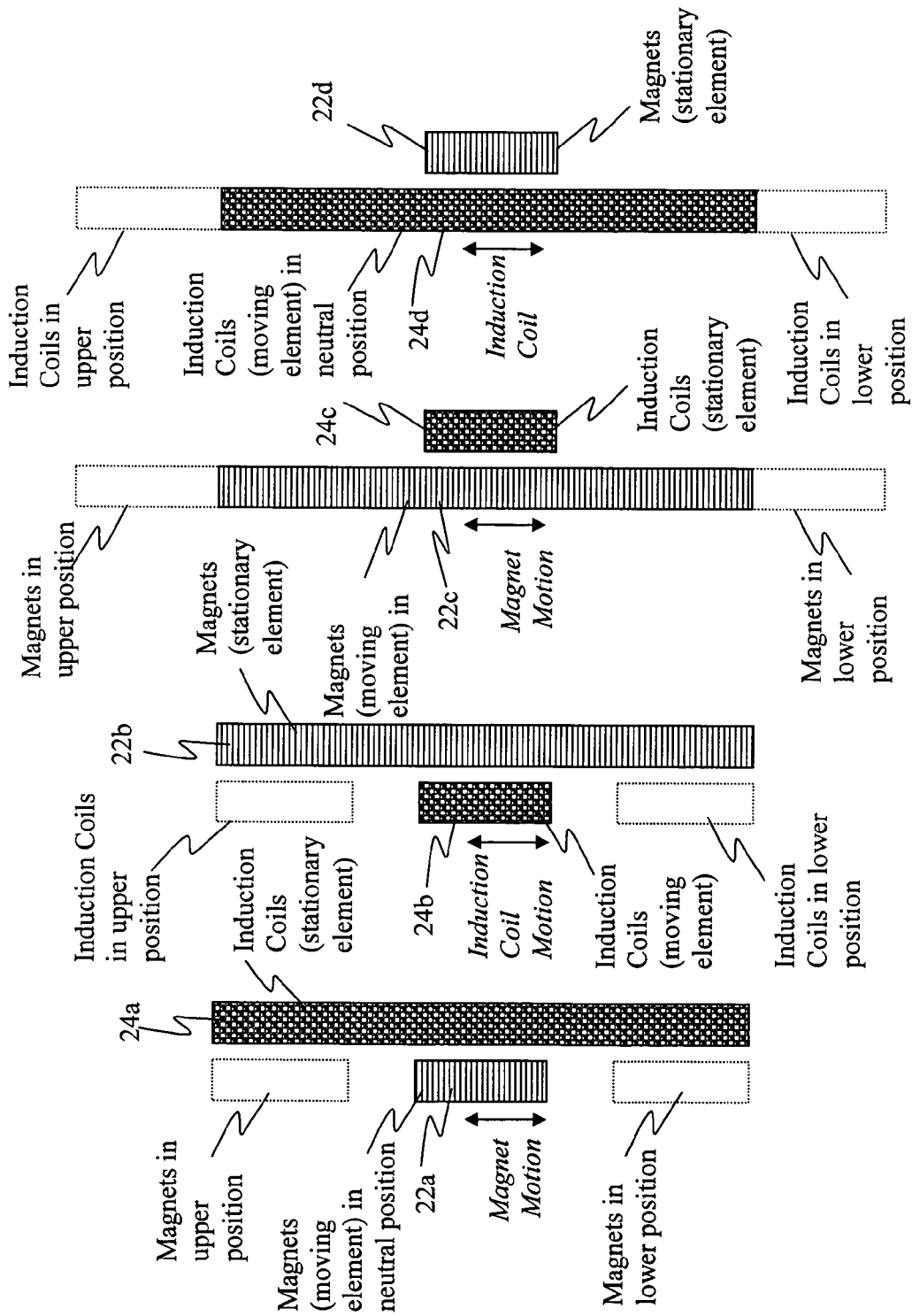
FIGS. 3A, 3B, 3C and 3D depict, illustratively, different configurations of magnetic arrays and induction coil assemblies suitable for use in practicing the invention.

FIGS. 1A-1D and FIGS. 2A-2D illustrate that there are several possible locations of the LEG assemblies and mechanical couplings to the shell and shaft. These different configurations are made possible, in part, due to the use of the "flexible" LEG configurations embodying the invention FIGS. 3A, 3B, 3C, and 3D are illustrative diagrams showing four possible permanent magnet and induction coil geometries. In FIG. 3A, the magnet assembly 22a is relatively short and designed to move relative to the induction coil assembly 24a which is designed to be relatively long (and to be stationary or move out of phase relative to the magnetic assembly). In FIG. 3B the induction coil assembly 24b is designed to be short and to be moving relative to the magnetic assembly 22b which is designed to be long (and to be stationary or move out of phase relative to the coil assembly). In FIG. 3C, the magnetic assembly 22c is designed to be long and to be moving relative to the corresponding induction coil assembly 24c which is designed to be short (and stationary or move out of phase relative to the magnetic assembly). In FIG. 3D, the induction coil assembly 24d is designed to be long and to be moving relative to the corresponding permanent magnet assembly 22d which is designed to be short (and stationary or move out of phase relative to the coil assembly). This shows four of the many possible variations in the geometries of the coil and magnet assemblies.

It should also be noted that the magnetic and coil assemblies may both be capable of moving at the same time (preferably at different speeds and/or in opposite directions).

As already discussed and as shown in some of the figures, the location of the magnetic and coil assemblies can be interchanged. For example, the magnets may be mounted on the inner central column (spar or shaft) and the coils may be mounted on the outer member (on the inside or the outside of the shell). Alternatively, the coils may be mounted on the inner central column (spar or piston) and the magnets may be mounted on the outer member (shell or vessel). The configurations shown in FIGS. 3A and 3B may be easier to implement than the configurations shown in FIGS. 3C and 3D. The configuration shown in FIG. 3A (moving short magnet, stationary long coils) avoids the need to move cables, but presents a problem due to dissipative losses in the long coils (which may require switching the coils to reduce the dissipative losses). The configuration shown in FIG. 3B (moving short coil, long stationary permanent magnets) may yield better mechanical-electrical conversion efficiency and avoid the need for coil switching. The embodiments having a short stator (coil assembly) and a long magnet, keep the induction coil winding impedance low. The other configurations have advantages that may make them preferred for certain systems. However, because of problems with long and powerful magnets there are configurations where a short magnet and a long coil configuration is preferable.

Figure 4A:
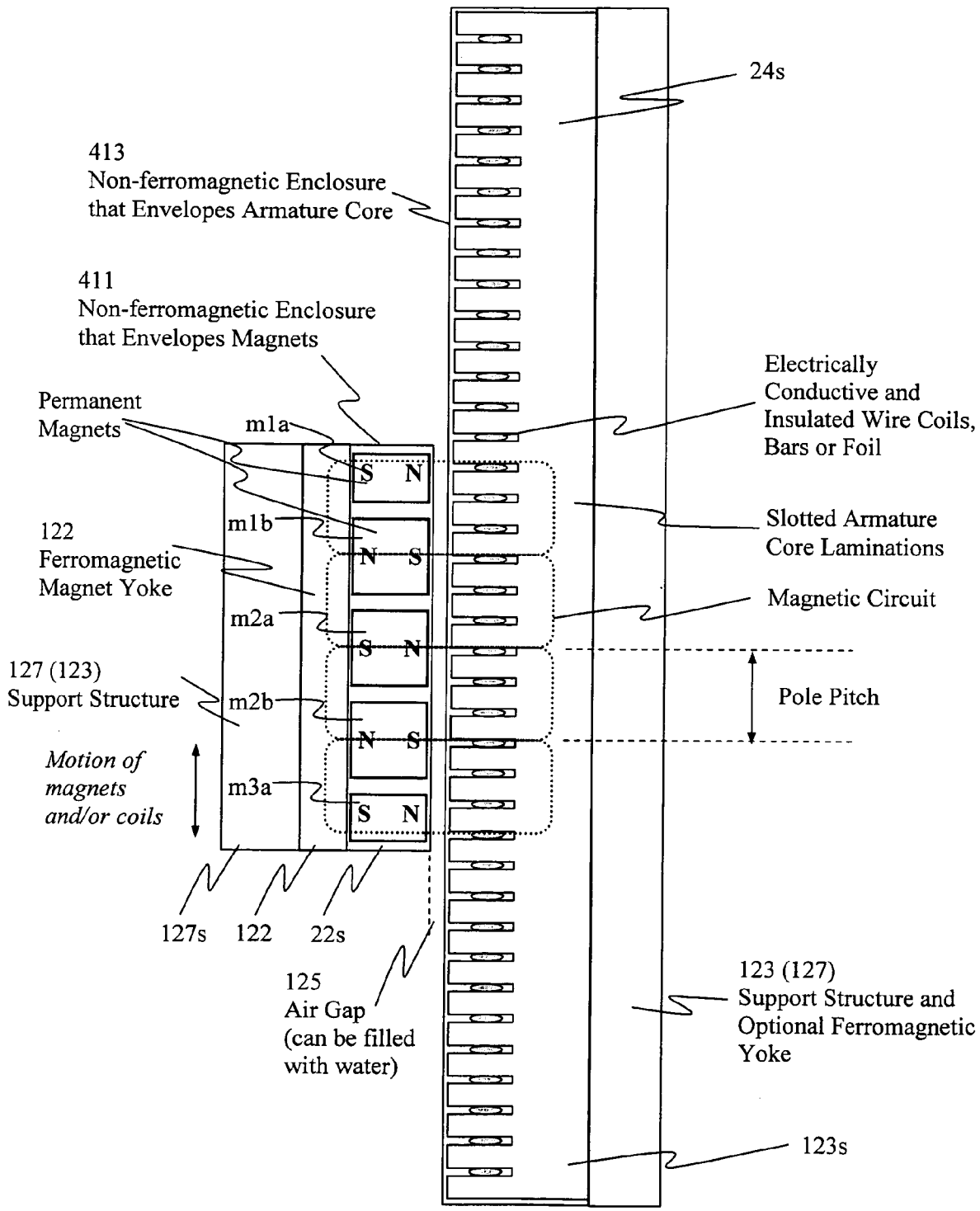
FIG. 4A is illustrative of a LEG with a "surface" permanent magnet assembly configuration using electrically conductive wire, coils bars or foil for practicing the invention.
Figure 4B:
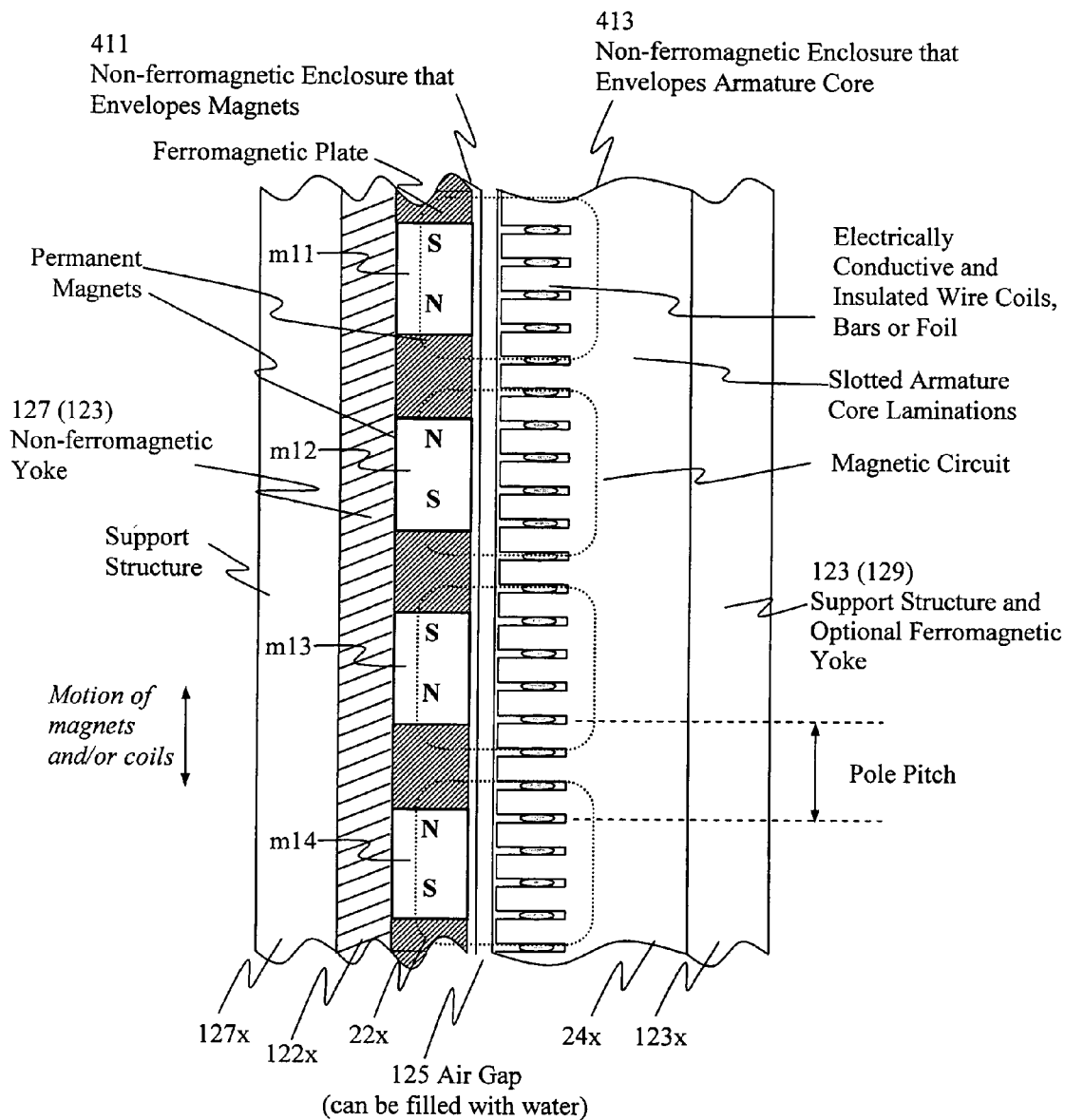
FIG. 4B is illustrative of a LEG with a "buried" permanent magnet assembly configuration using electrically conductive wires, coils, bars or foils, for practicing the invention.

FIGS. 4A and 4B are cross-sectional diagrams showing the formation of two different permanent magnet assembly and coil assembly configurations. FIG. 4A shows a structure which may be termed a "surface" permanent magnet configuration. In the structure of FIG. 4A, the permanent magnets 22s are mounted on a ferromagnetic plate 122s which is mounted on a magnetic support structure 127s. The magnetic assembly may be enclosed in a non-ferromagnetic enclosure 411. The magnets (mia, mib) of the magnetic assembly are affixed to the surface of the "magnetic" plate with the magnets magnetized in a direction perpendicular to the direction of relative motion between the induction coils and the magnets (mia, mib). Each magnet (mia—north-south pole) has a polarity opposite to that of its neighboring magnet (mib—south-north pole).

It is possible to configure each magnet pole out of multiple magnets (i.e. one magnet pole can actually be several side-by-side magnets magnetized with same polarity). The longitudinal distance between the centers of adjacent magnets (of opposite polarity) is the "pole pitch." The magnets are oppositely polarized and the number of magnets per assembly is typically a multiple of two.

The induction coil assembly 24s includes a slotted armature of ferromagnetic material which functions as a yoke mounted on a coil support structure 123s. The induction coil assembly is enclosed in a non-ferromagnetic enclosure 413. As shown in FIG. 4A, numerous slots are formed in the yoke, on the side facing the permanent magnet assembly 22, and conductive coils (electrically conductive and insulated wire coils, or bars, or foil) are inserted in these slots. The slots are perpendicular to the direction of relative motion between the magnet and coil assemblies. Each coil is formed of electrically conductive material (e.g., copper wire) that enters a slot on one side of the yoke, exits the slot on the other side, travels towards another slot located a distance of one magnetic pole pitch in the longitudinal direction and exits the same slot on the other side of the yoke. The number of slots and coils may be any multiple of two per magnet assembly pole pitch.

For example, a three-phase implementation would have three coils placed in six slots covering a longitudinal distance equal to that of the magnet pole pitch. This pattern of coils can be repeated over the length of the coil assembly and the coils can be connected in series, electrically, to increase the voltage output.

The motion of the coils relative to the magnets causes a voltage to be induced in the coils that is proportional to the magnitude and rate of change of magnetic flux. Electric current flows through the coils when an external load is connected across the terminals of the coils.

Referring to FIG. 4A, a magnetic "circuit" is comprised of a north polarized magnet, an air gap between the north polarized magnet and the induction coil assemblies, the coils and yoke assembly, the air gap between a south polarized magnet and coil assemblies, the south polarized magnet, and the ferro-magnetic magnet backing plate. Mechanical force and motion are converted to electrical current and voltage by means of this electromagnetic conversion.

FIG. 4B shows a magnet support plate 127x on which is mounted a non-ferromagnetic yoke 122x on which is mounted a ferromagnetic plate which includes permanent magnets contained within the ferromagnetic plate. In a particular embodiment of the type shown in FIG. 4B, two north poles were placed next to (and opposite) each other and two south poles next to each other. This structure is generally referred to as a "buried" permanent magnet configuration. Each one of the magnetic and coil assemblies are separately enclosed in non-ferromagnetic enclosures as shown in FIG. 4A. The "surface magnet" configuration of FIG. 4A as well as the "buried magnet" configuration of FIG. 4B are viable options for implementing the invention.

Figure 4C:
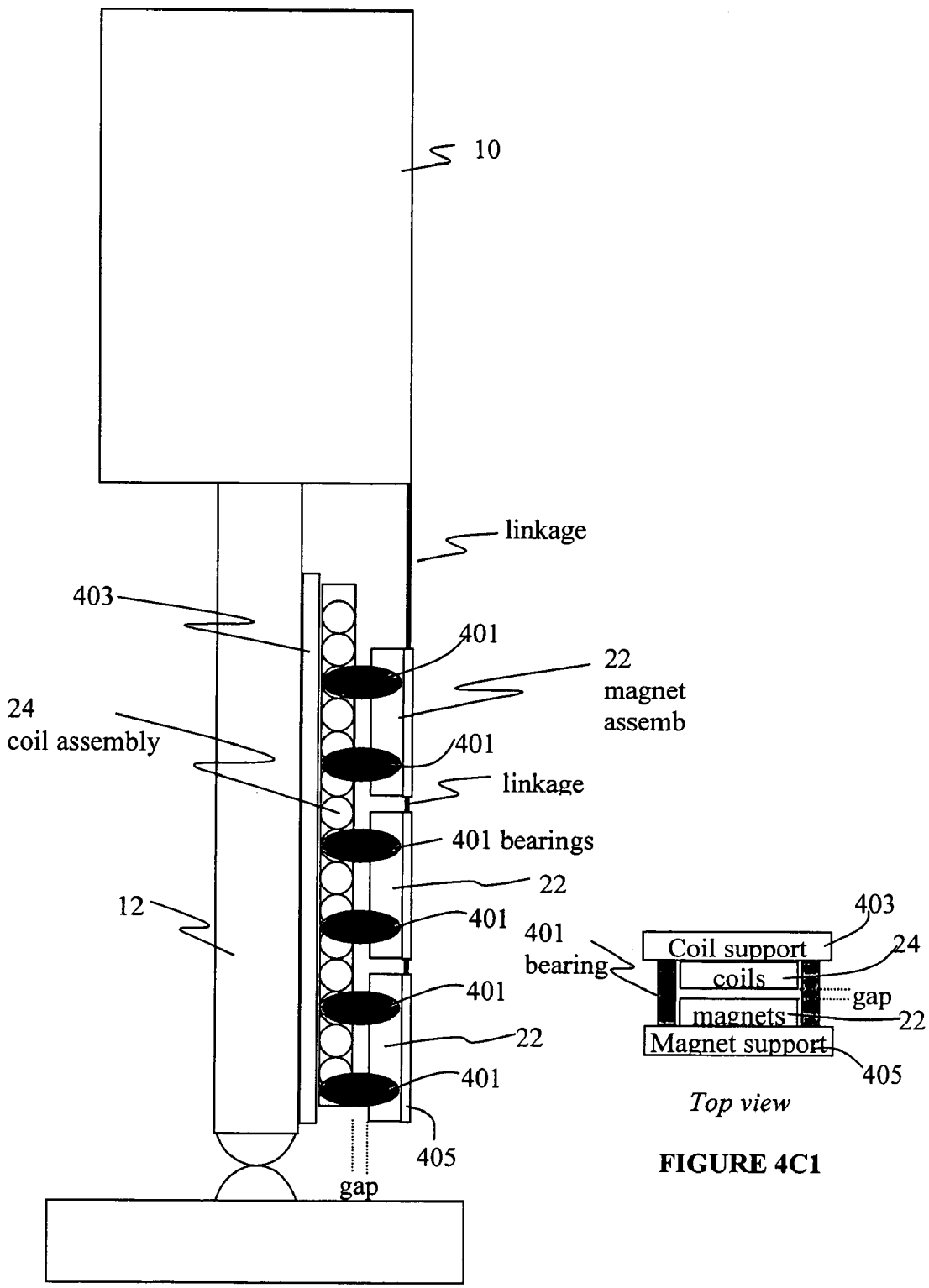

A problem exists in maintaining the "gap" distance between the induction coil assembly and the magnetic assembly relatively constant as the two assemblies pass each other. A problem also exists in the manufacture of long magnetic assemblies for use in the contemplated systems. FIGS. 4C and 4C1 illustrate how the gap between the coil assembly and the magnetic assembly may be maintained over the relative long distances which the magnets and/or coils may have to travel relative to each other under adverse conditions. Two features of the design shown in these figures should be noted. One, the magnets are divided into relatively small segments (e.g., 22a, 22b, 22c, etc . . . ) and two, the various segments are separated and supported by bearings, 401. This construction eliminates the need to form a long unitary magnetic assembly having precise measurements and eases the requirement that the very precise and small gap be maintained between the long unitary magnetic assembly and the induction coil assembly. In FIGS. 4C and 4C1 the induction coil assemblies 24 are mounted on and supported by a coil support structure 403 which may be attached (or coupled) to a central column 12 or shell 10. The segmented magnetic assemblies 22a, b, c, are mounted on and supported by a magnet support structure 405 which may be attached to the shell 10 or the column 12. Bearings 401 function to hold the coil and magnet assemblies apart maintaining the desired gap distance between the two assemblies. At the same time, the bearings 401 also aid in the movement of the two assemblies relative to each other. The bearings 401 may be circular (wheels) to permit easy travel. A possible configuration is shown in FIG. 1B2 in which the wheels can ride on a rail.

Figure 5:
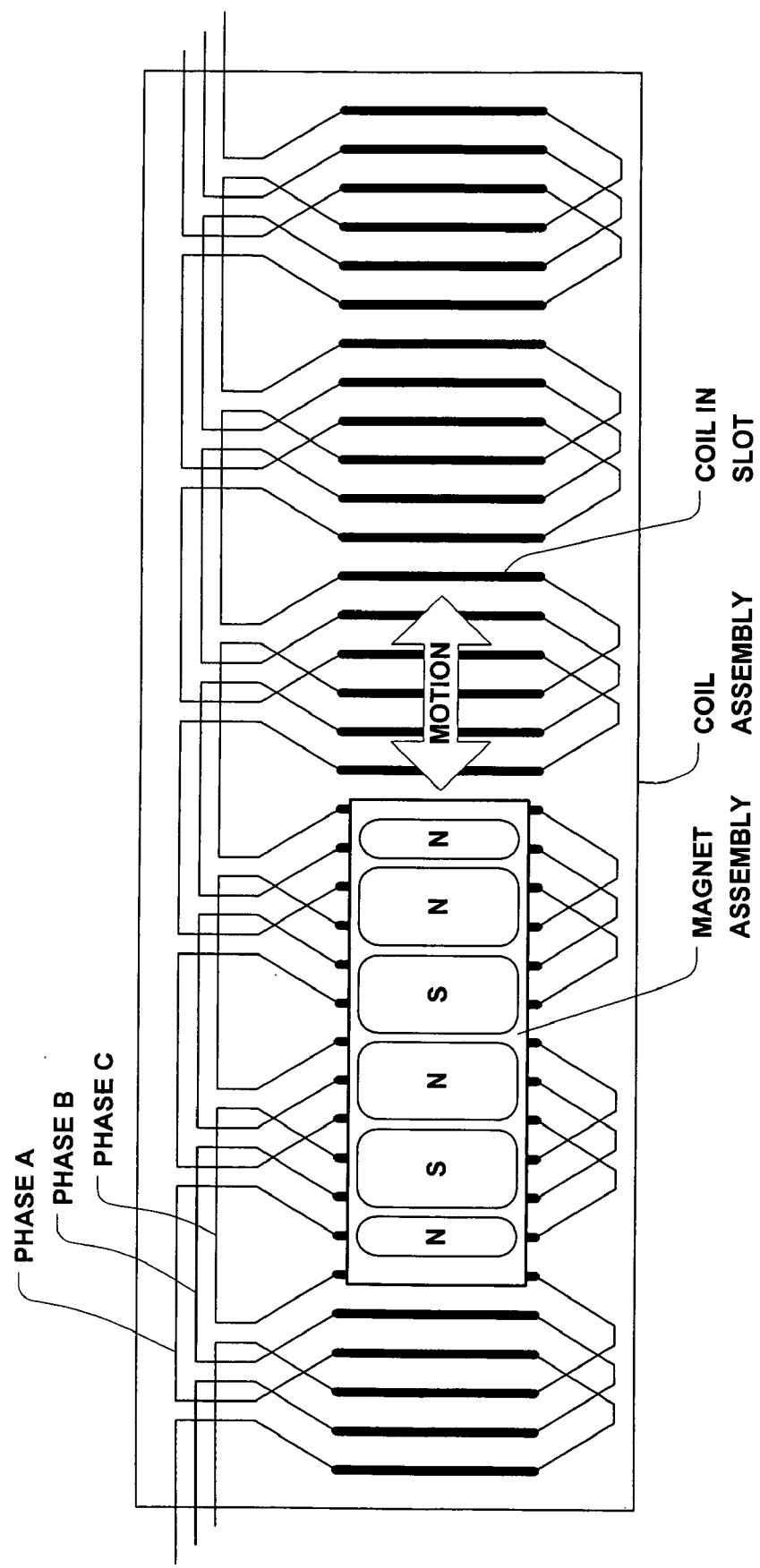

FIG. 5 illustrates a three (3) phase coil arrangement with the outline of a magnetic assembly passing over the coil assembly in order to induce the generation of a 3 phase voltage in the coil assemblies. Numerous coil turns (N) may be wound at each pole position to increase the voltage generated across each coil since $e=(N)(d\phi/dt)$, where $\phi$ is the magnet flux linking the coils.

Figure 7:
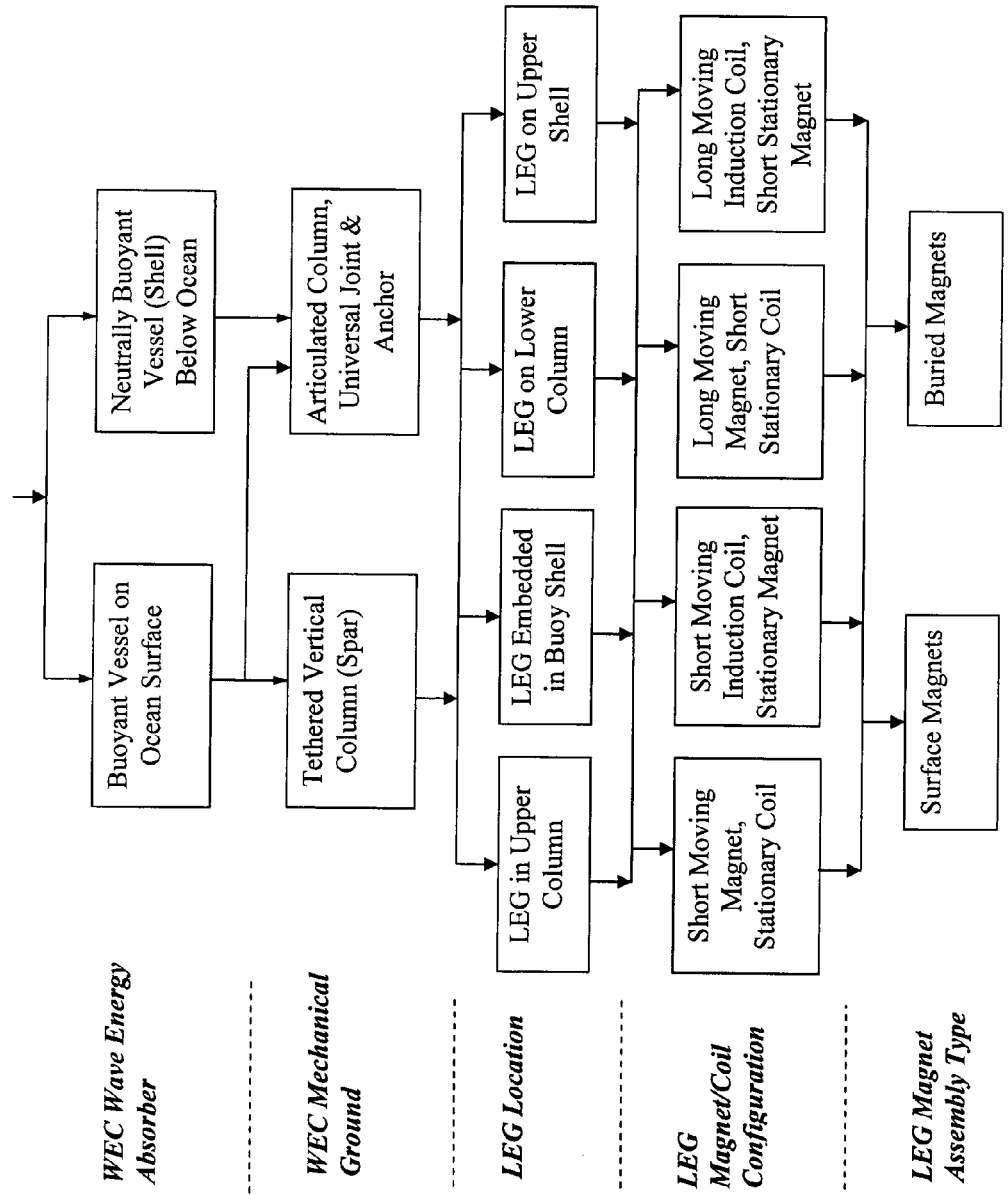
FIG. 7 is a block diagram illustrating various possible combinations of design features for practicing the invention.

FIG. 7 is a chart illustrating a number of different possible combinations of wave energy converter mechanical design and LEG configurations. The chart shows the wide range of configurations which may be encompassed in accordance with the invention.

Velocity Multiplication

The voltage and frequency of electric power obtained from a LEG is a function of the velocity with which the magnets and the coils interact (i.e., the speed at which one passes over, or by, the other). Generally, doubling the velocity of the coils (or magnets) passing the magnets (or coils) of the LEG results in a doubling of the output voltage and frequency obtained from the LEG for a given coil configuration. For a fixed power input, doubling the velocity of the coils (or magnets) passing the magnets (or coils) of the LEG results in a halving of the force exerted on or by the LEG and consequently on the size of the coil assembly. Consequently, it is sometimes desirable to increase the velocity of the coils passing along the magnets. A system for accomplishing this result is shown in FIG. 1D which shows back-to-back LEGs placed on the outside wall of a WEC shell.

FIG. 1D1 details the WEC shown in FIG. 1D with one LEG assembly and illustrates what may be referred to as a linear electric generator velocity multiplier system. To appreciate the structure of the system, refer also to the cross sectional diagram of FIG. 2D which shows a typical positioning of the shaft 12 and the shell 10 and LEG assemblies which include a coil assembly and a permanent magnet assembly separated by an air gap. In FIG. 1D1, the shaft 12 is tethered and the shell 10 is positioned about the shaft and remains so positioned; but it can move up and down relative to the central shaft 12 by means of shaft bearings 910, 911 which enabled it to slide up and down. The LEG assembly 20 includes: (a) a permanent magnet assembly 22 which is located on or along the outside wall of the shell and which runs along the length of the shell 10; and (b) an induction coil assembly 24 also located on the outside of the shell, exterior to the magnetic assembly. A radius arm 920 is connected to column shaft 12 at a pivot point (fulcrum) 901, whereby the two ends of radius arm 920 can swing up and down like as see-saw. One end, 925, of radius arm 920 is linked to the shell 10 and moves up and down with the shell. The other end, 921,902, of the radius arm 920 is coupled to the coil assembly (or the magnetic assembly) and causes it to move in a direction opposite to the direction in which the shell is moving. Velocity multiplication is obtained by varying the ratio of the distance from the pivot point to the ends of the radius arm. In FIG. 1D1 the length of the radius arm from the pivot point to the one end 925 coupled to the shell 10 is defined as "a" and the length of the radius arm from the pivot point to the other end 921, 902 is defined as "b". One end 921 of pivot arm 920 is coupled to pivot point 902 which is coupled via a connecting arm (rod) 923 to a pivot point 905 which is connect to one end of coil assembly 24. Another end 925 of pivot arm 920 is coupled to a pivot point 903 which is coupled via a link arm 927 to a pivot point 904 which is connected to the bottom right hand side of the shell 10, as shown in FIG. 1D1.

A pressure differential between the top and bottom surfaces of the WEC 10 (i.e., shell 10) causes the shell 10 to move downward with velocity v1, as shown on FIG. 1D1. The shell 10 travels in a path generally parallel to the spar (shaft) with the shaft 12 passing through the bearings 910, 911. The shell 10 is connected to the radius arm 920 by means of link arm 927. When the shell 10 moves down it causes point 903 to be pushed down and points 901 and 902 to be driven upward. Assume that the length of the link arm from point 903 to the central pivot point 901 is "a" and that the length of the link arm from central pivot point 901 to point 902 is "b". The radius arm 920 which is connected to the shaft at pivot point 901 can produce different multiplication ratios by changing the dimensions of "a" and/or "b". That is, the radius arm 920 extends for a distance "a" between pivot point 901 and the end 925 of the arm 920 and extends a distance "b" between pivot point 901 and the end 921 of arm 920. Assume that the arm 920 may be moved and secured such that the distance "a" may be made equal to or less than distance "b". When "a" is equal to "b", the velocity v1 is equal to velocity v2; when "b" is greater than "a", the velocity v2 is greater than v1. In fact, when "b" is twice the value of "a", v2 is twice the value of v1. The relationship of v2 to v1 may be expressed as follows: v2 is approximately equal to (b/a) times v1.

A permanent magnet assembly 22 of LEG 20 is shown attached along the length of the WEC shell 10. The induction coil assembly 24 is magnetically coupled (tightly) to the magnetic assembly 22 and is physically constrained to travel along the magnetic assembly. The coil assembly is connected to the end 921 or radius arm 920 by connecting rod 923. The coil assembly 24 moves upward when the WEC moves downward and vice versa when the shell 10 moves upwards. By adjusting the radius arm ratio of "a" and "b", different relative velocities can be obtained between the permanent magnetic assembly 22 (functioning as the rotor) and the coil assembly 24 (functioning as the stator) of the LEG.

The relative velocity (delta v) may be described as follows:

$$\text{Delta } v = v1 + v2 = v1(b+a)/a$$

Note: to correctly interpret equation 1A it must be recalled that v1 and v2 are going in opposite direction such that if a plus sign is assigned to one direction, the opposite direction is a minus.

FIG. 1D2 illustrates that the LEG assembly may be located on the inside wall of the shell 10. The operation of this configuration is otherwise similar to that of FIG. 1D1.

FIG. 1D3 illustrates that the induction coil assembly 24 may be laid out along the length of the shell and a permanent magnet assembly 22 can be coupled to one end of a rod 923 so as to move back and forth across and along the coil assembly.

FIG. 1D4 illustrates that a section 150u is formed at or above the top of the shell 10 and a section 150d is formed at or below the bottom of the shell 10. Sections 150u and 150d may be part of the LEG assembly and provide additional travel for the coil or magnetic assembly. Alternatively, sections 150u and 150d may include means for braking or damping the travel of the magnetic assembly and preventing it from going beyond the top or bottom of the shell 10. Sections 150u and 150d may include, for example, shorted coils or a copper bar or any like apparatus which will provide a strong counter force to the movement of the magnetic assembly.

FIG. 1D5 illustrates that the LEG may be formed in a groove in the external wall of the shell.

FIG. 1D6 illustrates that the LEG assembly could also be located along the column within the shell.

Electromagnetic Braking/Damping Systems—

FIG. 8 illustrates a prior art mechanical damping system in which a PTO is connected between the shell 10 and a central column 12 and mechanical damping means 801a, 801b, 801c and 801d are used to prevent the shell 10 from going above a certain level relative to shaft head 803 and from going below a certain level relative to the shaft head. In this type of system, there may be excessive forces applied to the stops 801a, b, c, and d. In accordance with the invention dynamic braking/damping may be achieved using electromagnetic means coupled between the shell and the column FIG. 9A1 shows a LEG magnetic assembly 22 formed with surface magnets (see FIG. 4A) which is intended to move relative to the LEG coil assembly 24 to generate useful electrical energy. The magnetic assemblies are connected to one of the shell and column and the coil assemblies are connected to the other one of the shell and column. As described above, a LEG coil assembly 24 is present along the desired range of travel of the magnetic assembly 22 to generate electrical power signals which are supplied to a power converter. A coil region 240$u$ is formed above coil assembly 24 and a coil region 240$d$ is formed below coil assembly 24. The coils of region 240$u$ and 240$d$ are shorted. Alternatively, the coils 240$u$ and 240$d$ could be selectively shorted by means of a switch connected across the coils to cause them to short when the magnetic assembly moves in close proximity to the coils.

In operation, when the magnetic assembly 22 travels in an upward direction beyond the coil assembly 24 and passes over the coil region denoted as 240$u$, a very strong electromagnetic force is generated opposing the motion of the magnetic assembly relative to the shorted coils and tending to prevent the magnetic assembly from moving up beyond the shorted coil region. This tends to cause the shell and column to on which the magnets and coils are attached to be locked into position vis-as-vis each other. Concurrently any current induced in the coil windings cause much energy to be dissipated in the form of heat.

In a similar manner, when the magnetic assembly 22 travels in a downward direction beyond the coil assembly 24 and passes over the coil region denoted as 240$d$, a very large electromagnetic force is generated opposing the motion of the magnetic assembly relative to the shorted coils and tending to prevent the magnetic assembly from moving down beyond the coil assembly.

In FIG. 9B1, the shorted coil assemblies of FIG. 9A1 are replaced by reaction plates 242$u$ and 242$d$. The reaction plates are of a highly conductive material (e.g., copper) to induce an electromagnetic braking/damping force of a similar type to that developed with the shorted coils of FIG. 9A1. Note that the braking effect can be enhanced by adding ferromagnetic materials behind the reaction plates.

In FIG. 9C1 the LEG magnetic assembly 22 includes buried magnets, of a similar type to those shown in FIG. 4B. The coil assembly 24 is similar to the one shown in FIG. 4B and the operation of the braking/damping is similar to that described for FIG. 9A1.

In FIG. 9D1 the LEG magnetic assembly includes buried magnets and the braking/damping is accomplished using reaction plates 242$u$, 242$d$ as illustrated for FIG. 9B1.

FIGS. 9A2, 9B2, 9C2, 9D2 show cross-sections of part of damping/braking structures which may be used to practice the invention.

Figures 10A, 10B:
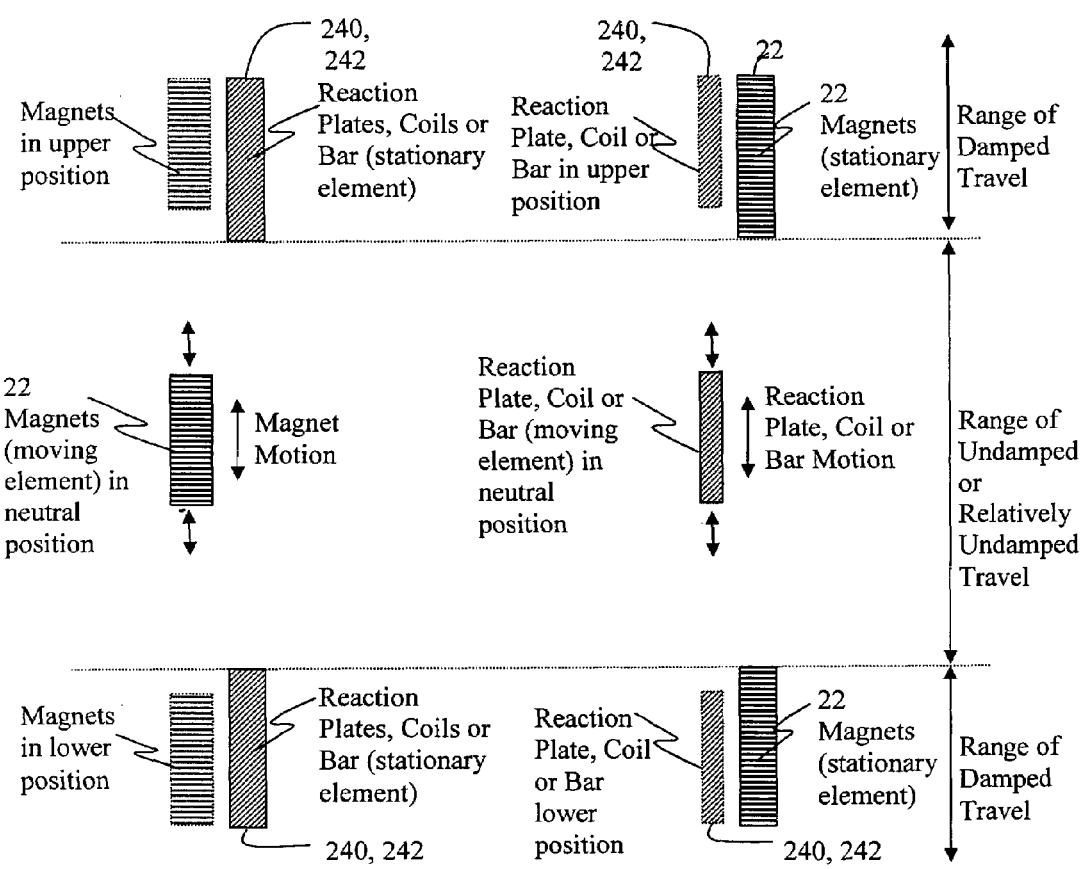
FIGS. 10A and 10B illustrate the range of undamped travel when any PTO device is used and the range of damped travel of the shell and column due to the braking effect of LEG assemblies, in accordance with the invention.

FIGS. 10A and 10B illustrates that in a dynamic braking system, the PTO device may be any suitable means (e.g., hydraulic or electromagnetic) for converting the relative motion of the shell and column into useful electrical energy. However, an electromagnetic arrangement of magnets and coils (or reaction plates) may be used to provide the braking/damping when the distance of travel between the shell and column exceeds a predetermined value. Thus during the indicated range of "undamped travel", any PTO device may be used to convert the mechanical motion between the shell and column to electrical energy. It should be understood that in the "undamped" travel region there is some damping due to the extraction of power by the system. However, this damping is done to extract useful power and not to try to stop the system part from moving relative to each other. Clearly, when the travel of the shell exceeds the "undamped" range the electromagnetic damping system comprising of magnetic assemblies and reaction plates or shorted coil assemblies are used to provide braking/damping of the shell and coil to which the magnetic assemblies and the coils are attached in order to prevent movement between the shell and central column.

Figures 10C, 10D:
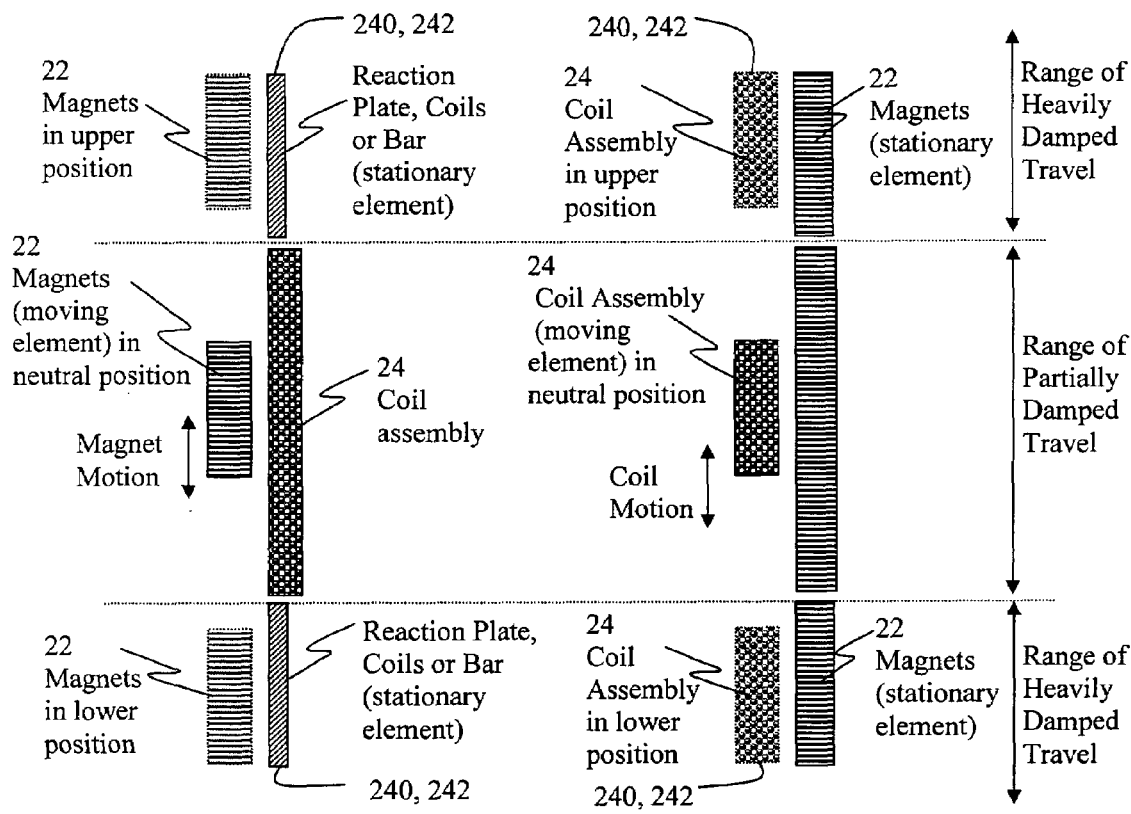
FIGS. 10C and 10D illustrate the range of undamped travel and range of damped travel of the shell and column due to the braking effect of the LEG assemblies, using LEGs as the PTO device.

FIGS. 10C and 10D illustrate the range of undamped travel and range of damped travel of the shell and column due to the braking effect of the LEG assemblies, using LEGs as the PTO device. When the magnet assemblies (FIG. 10C) and/or the coil assemblies (FIG. 10D) exceed the range of undamped (or partially undamped) travel the electromagnetic braking comes into play causing a range of heavily damped travel and tending to limit any further travel of the shell relative to the column. These structures and systems make use of the existing magnets and coils used to generate electrical energy and/or or like magnet/coil assemblies and by the addition of a few similar components function to introduce a very effective braking/damping system to protect the WEC during heavy seas and storm conditions which require that the WEC be placed in a protective mode (e.g., lock-down condition). As noted above, the coils to provide dynamic braking may be selectively shorted or [permanently shorted.

Figure 11:
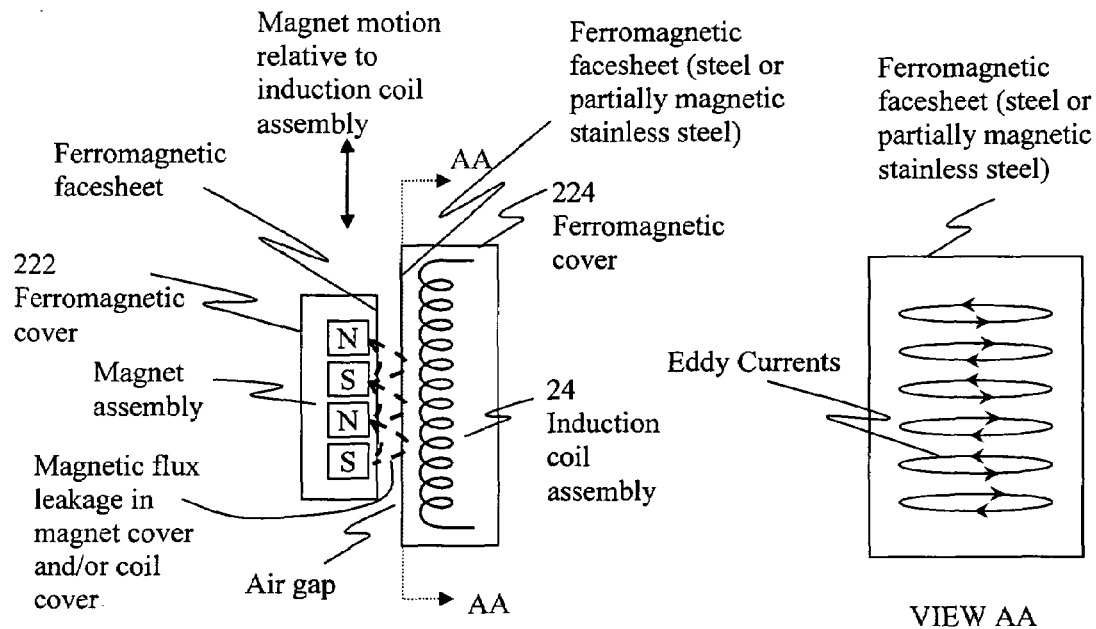
FIG. 11 is a diagram illustrating a LEG packaging arrangement subject to substantial eddy current losses.

Packaging the LEG:

FIG. 11 illustrates that in accordance with the invention the magnetic assembly 22 is independently packaged from the induction coil assembly 24. The magnetic assembly 22 is enclosed in a steel case 222 and the induction coil assembly is enclosed in a steel case 224. A problem with this packaging is that, as the magnetic assembly passes over the coil assembly (or vice-versa) there are eddy current losses due to the changing magnetic flux within the electrically conductive steel casings. As the magnets pass over, the changing magnetic flux induces voltage in the covers (e=(k)(d$\phi$/dt)) and, given the high electrical conductivity of the covers, results in high cover material currents, which in turn results in parasitic power losses and magnetic fields that can lesson the performance of the LEG. Another problem with this packaging approach is that the magnet assembly and coil assembly covers provide a low reluctance path for the magnetic flux to couple with the adjacent pole or poles. As a result, less magnetic flux encircles the electrical conductors in the coil assembly, thereby lowering the efficiency of the magnetic circuit and hence that of the LEG.

Figure 12:
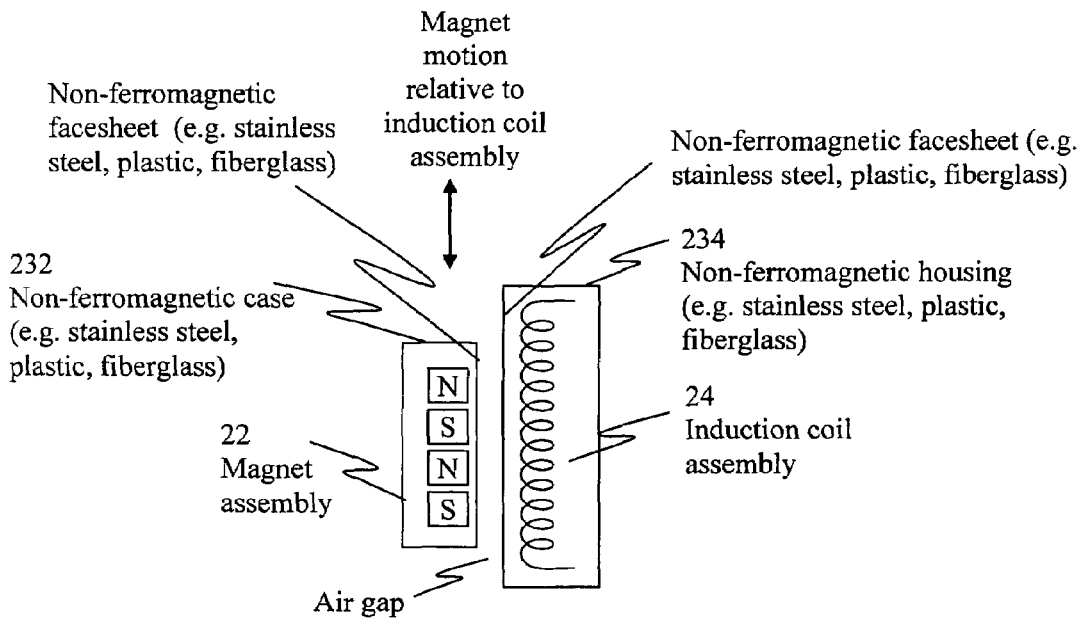
FIG. 12 is an illustrative diagram of packaging an LEG, in accordance with the invention, to reduce eddy current losses between the permanent magnet assembly and the induction coil assembly.
Figure 13A:
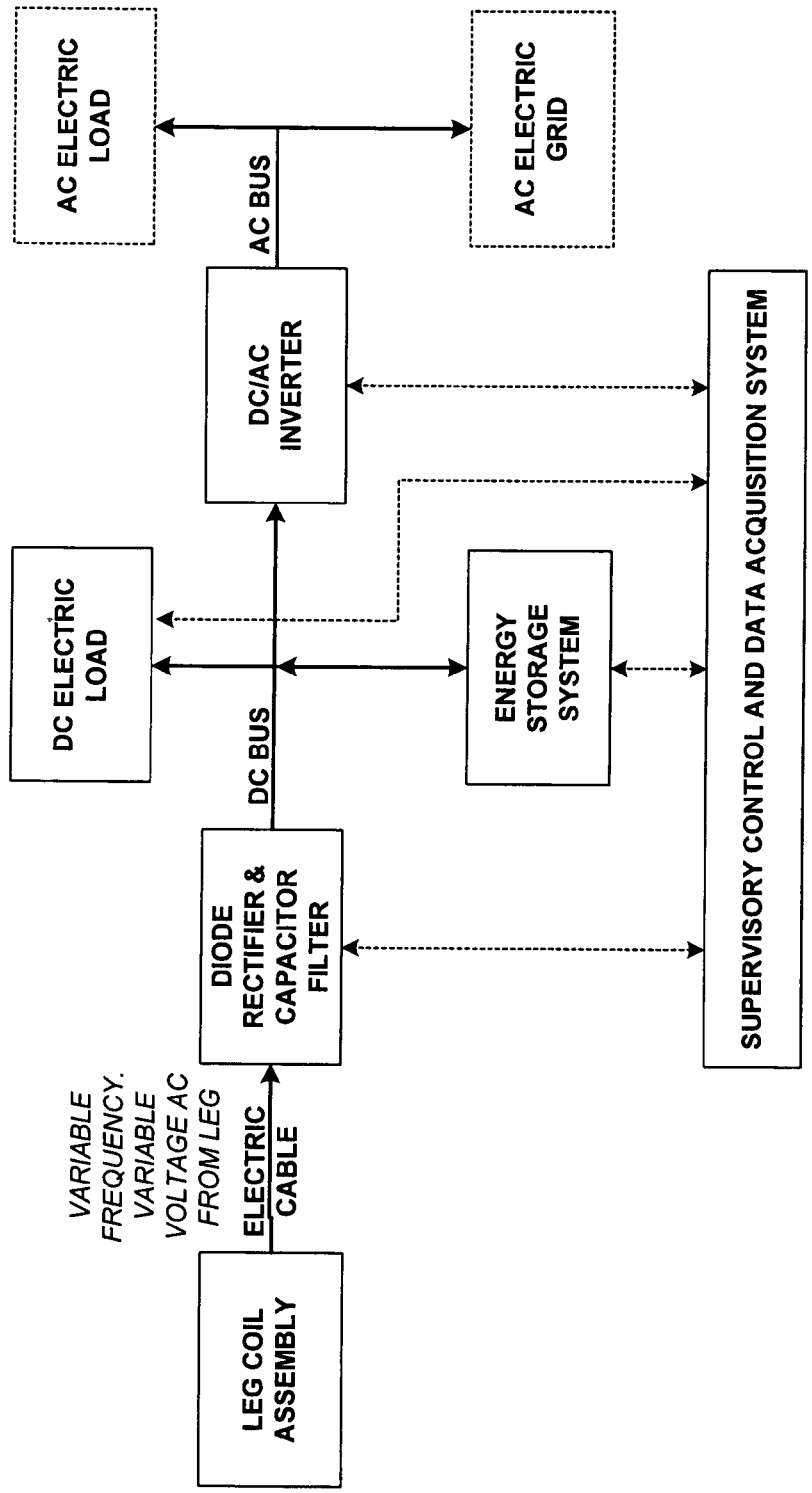
FIG. 13A is a block diagram of a LEG power conversion system using a passive rectifier configuration.
Figure 13B:
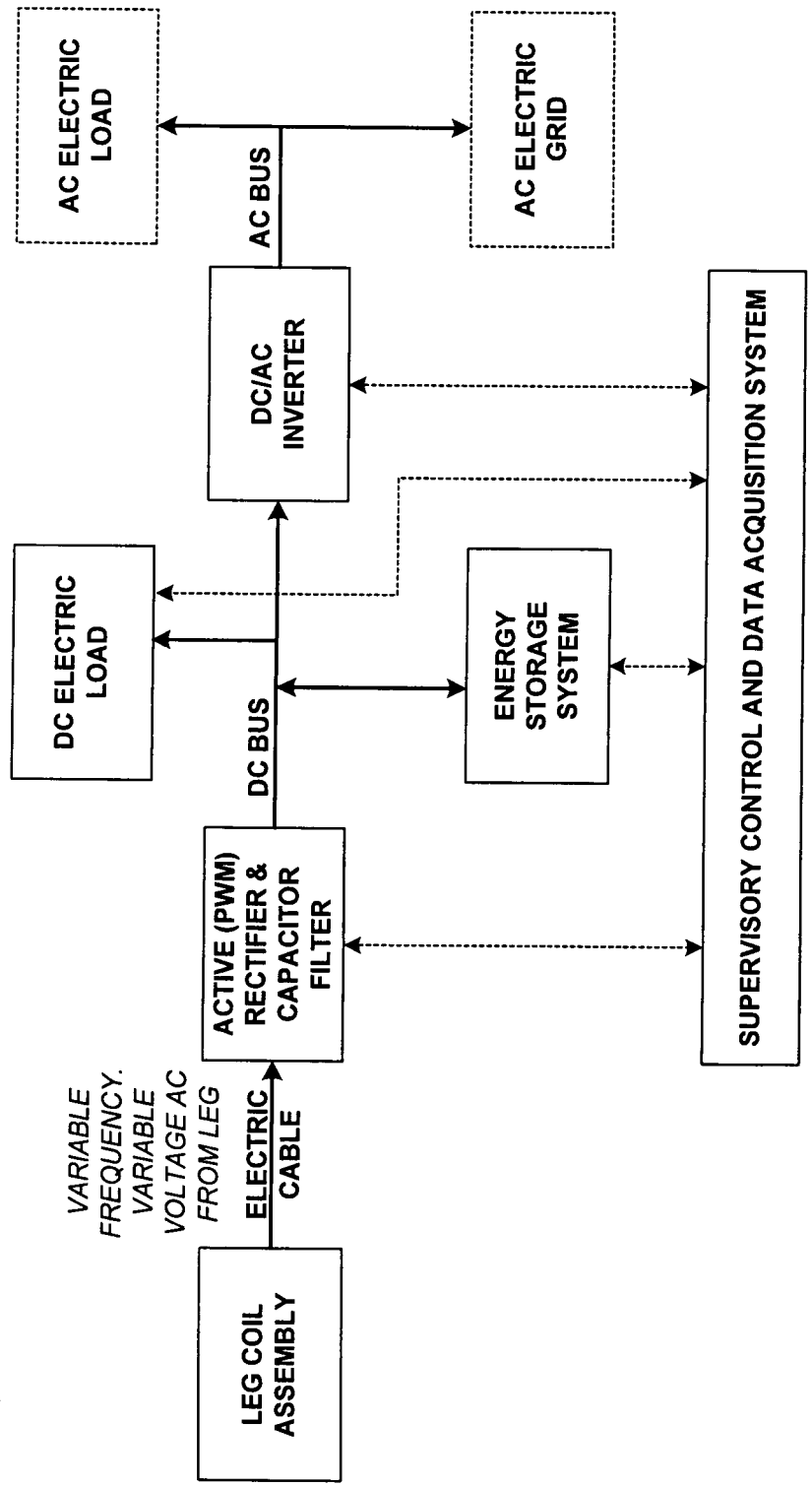
FIG. 13B is a block diagram of a LEG power conversion system using an active rectifier configuration.
Figure 13C:
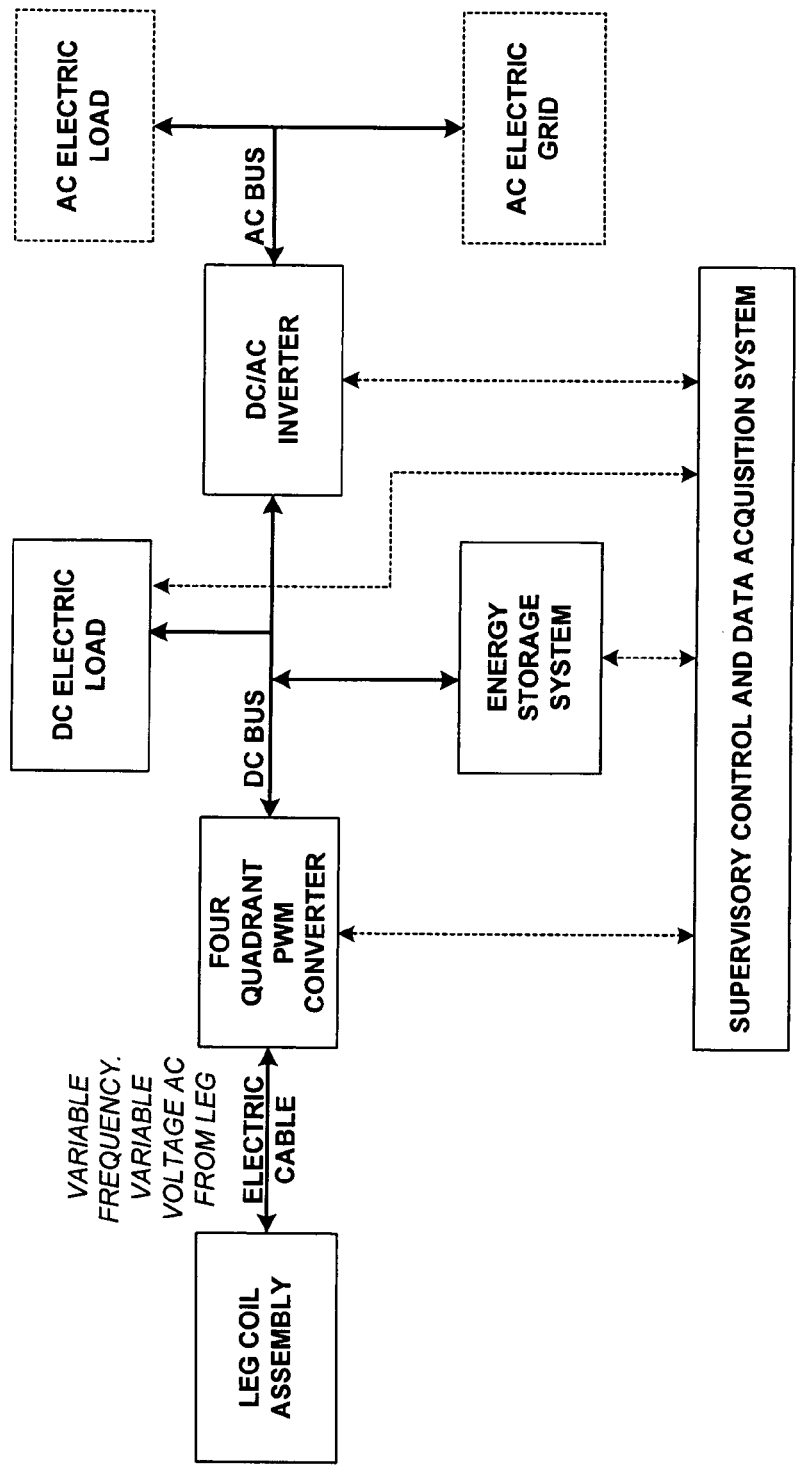
FIG. 13C is a block diagram of a LEG power conversion system using an active rectifier configuration.

Applicants recognized this problem and solved it using the apparatus shown in FIG. 12. In FIG. 12, the induction coil assembly 24 is enclosed in a non-ferromagnetic housing which may be, for example, a plastic enclosure or a stainless steel case which is transparent to magnetic lines. Also, the enclosures may be made very thin (e.g., on the order of 0.010" to 0.020") to substantially reduce, if not eliminate, eddy current losses. Note that by making the casings ultra thin, even steel cases may be used, as shown in FIG. 11, with significant reduction in eddy current losses.

Figure 14:
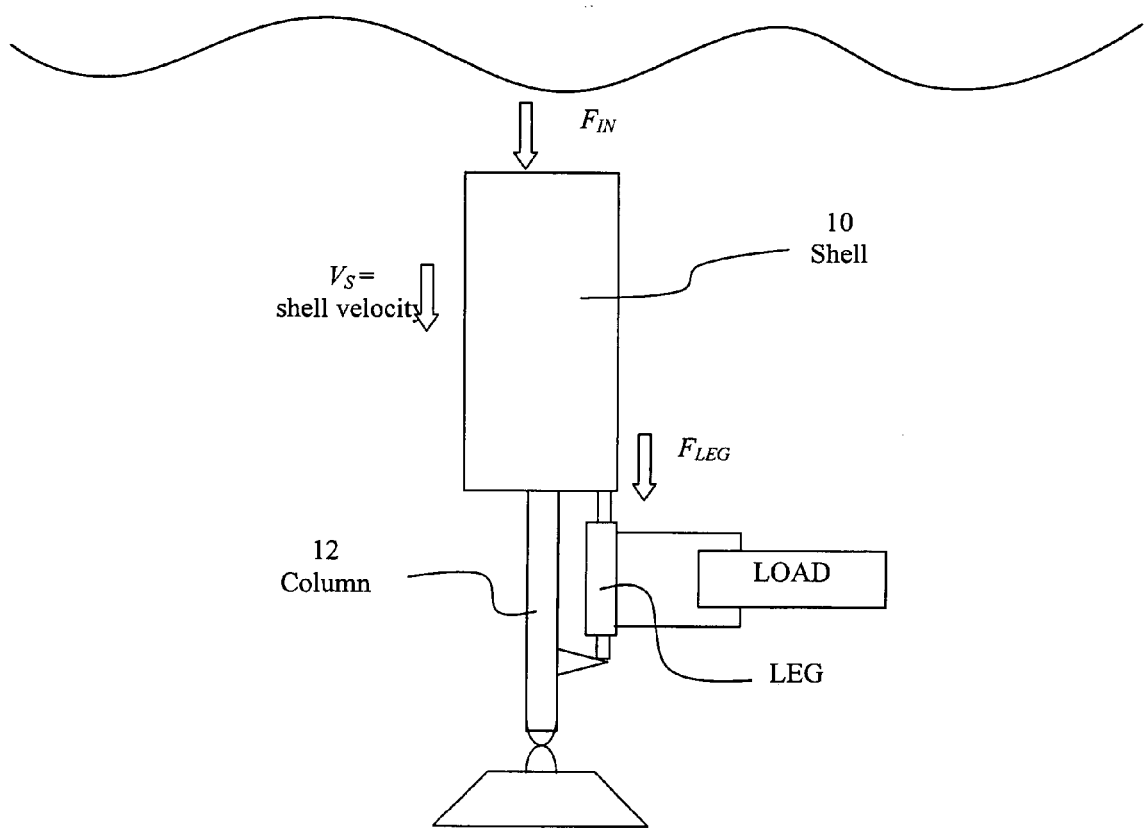
FIG. 14 is a block diagram of a WEC with the PTO being a LEG and with a load coupled to the LEG.

A simplified block diagram of an anchored WEC is shown in FIG. 14. The simplified equation of motion for the WEC is:

$$F_{IN} = M_{WEC} \cdot \frac{dV_S}{dt} + F_C \qquad (1)$$

where $V_S$ is the shell velocity, $F_{IN}$ is the differential force applied to the shell by the ocean wave, $dV_S/dt$ is the acceleration of the WEC shell, and $F_C$ is the counter force exerted on the shell as electrical power is extracted from the load.

Rewriting Equation (1) in terms of system parameters, we obtain for a resistive load $$\rho AH \cdot \frac{\delta}{2} = \rho AL \cdot \frac{dV_S}{dt} + F_C = \rho AL \cdot \frac{dV_S}{dt} + \frac{K_E K_F V_S}{R_L} \qquad (2)$$

where $\rho$ is the mass density of water, g is gravity, A is the shell platform area, H is the wave height (peak to trough), L is the length of buoy, $K_E$ and $K_F$ are the voltage and force constants of the electric generator, and $R_L$ is the generator load resistance.

The $K_E$ parameter relates generator voltage to the relative speed of the magnet and coil assemblies of a LEG $$V_{LINE\text{-}LINE} = K_E \cdot V_S \qquad (3)$$

The $K_F$ parameter relates LEG back force as a function of generator line current $$F_{LEG} = K_F \cdot I_{GEN} \qquad (4)$$

where $I_{GEN}$ is the generator line current.

For a submerged WEC buoy, the parameter $\delta$ is derived directly from the solution of the wave equation and represents the fall-off in pressure in the vertical dimension. It is given by:

$$\delta = \left(1 - \cosh\left(\frac{2\pi L}{\lambda}\right) + \tanh\left(\frac{2\pi D_W}{\lambda}\right) \cdot \sinh\left(\frac{2\pi L}{\lambda}\right)\right) \qquad (5)$$

where $D_W$ is the water depth and $\lambda$ satisfies the relation $$2\pi\lambda = gT^2 \tanh\left(\frac{2\pi D_W}{\lambda}\right).$$

For sinusoidal motion (a regular wave), complex notation can be used. Defining $F_{IN} = 0.5\, \rho gAH \cdot \delta \sin(\omega t)$ as the effective input forcing function caused by the incident wave on the shell, the solution for the shell velocity with a resistive load $R_L$ is:

$$V_S = \text{Re}\left[\frac{F_{IN} R_L}{K_E K_F (1 + j\omega\tau)}\right] = \text{Re}\left[\frac{V_{SM}}{1 + j\omega\tau}\right] \qquad (6)$$

where Re[X] denotes the real part of X, $$V_{SM} = \frac{F_{IN} R_L}{K_E K_F} \qquad (7)$$

is the peak shell velocity, $\omega = 2\pi/T$ is the input wave angular frequency, $\tau = R_L C_{EFF}$ and $$C_{EFF} = \frac{\rho AL}{K_E K_F} = \frac{M_{WEC}}{K_E K_F} \qquad (8)$$

is an equivalent capacitance proportional to the mass of the water column in the cylinder.

It is seen from Equation (6) that the system dynamics with a resistive load can be represented as a first order low pass filter with a 3 dB point of $\omega_3 = 1/\tau$. It should be pointed out that all mechanical and electrical parameters could be derived from the solution for shell velocity given in Equation (1). The corresponding equations for shell stroke S, power out Pout, and optimum resistive load $(R_L)_{OPT}$ are presented below.

The equation for shell stroke is as follows:

$$\text{Stroke} = \text{Re}\left[\frac{V_S}{j\omega}\right] = \text{Re}\left[\frac{V_{SM}}{j\omega(1 + j\omega\tau)}\right] \qquad (9)$$

The equation for generator output power is given as follows:

$$P_{OUT} = \frac{v_L^2}{2R_L} = \frac{K_E^2 \omega_S^2}{2R_L} = \frac{K_E |V_S|^2}{2R_L} = \frac{F_{IN}^2 R_L}{2K_F^2 (1 + \omega^2 R_L^2 C_{EFF}^2)} \qquad (10)$$

where $v_L$ is the line voltage and $\omega_S$ is the angular shaft speed of the generator.

It is seen that the $M_{WEC}$ term in Equation (8) is electrically equivalent to an effective capacitance. Maximum power is then transferred to the generator load if the electric load is the complex conjugate of the source impedance (i.e. an effective inductor and a resistor). This can greatly improve power transfer efficiency. The addition of an "inductive" element modifies the system equation of motion (1) and results in a $2^{nd}$ order system in velocity.

Figure 15A:
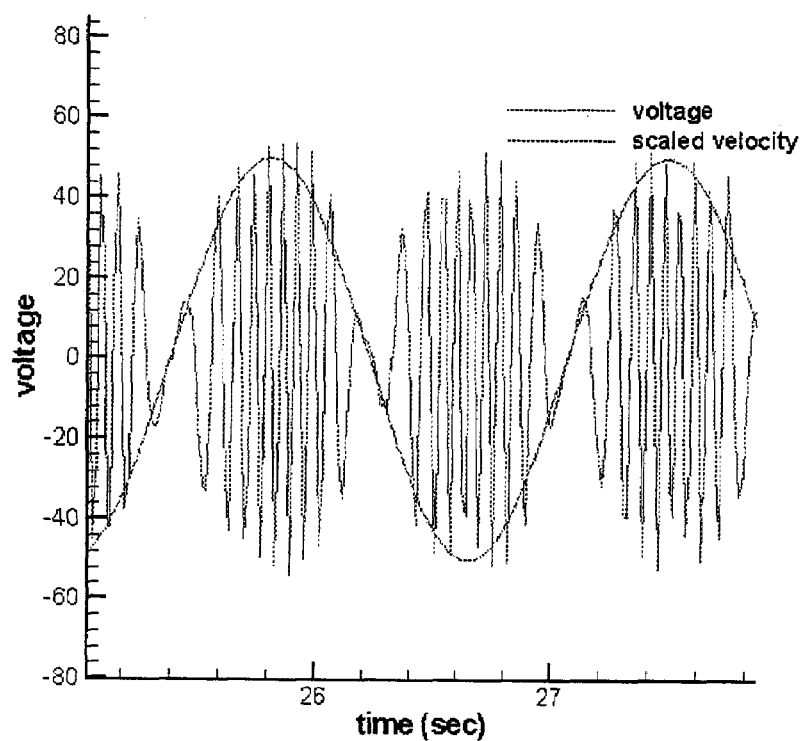
FIGS. 15*a* and 15*b* are waveform diagrams illustrating voltage and power generated with LEGs installed in WECs, in accordance with the invention.

FIG. 15a shows the LEG output voltage as a function of the WEC shell-to-column differential speed (i.e., the speed of the shell relative to the column). As shown, LEG output voltage amplitude is proportional to speed. LEG output voltage is also proportional to magnetic flux and coil configuration. LEG output voltage frequency is shown also to be proportional to speed. This may be explained as follows. Each time a coil passes over a pole pair (north-south magnets) a voltage cycle is produced. If the coil passes over the pole pair in less time (due to increased velocity), the frequency of the output voltage is increased.

Figure 15B:
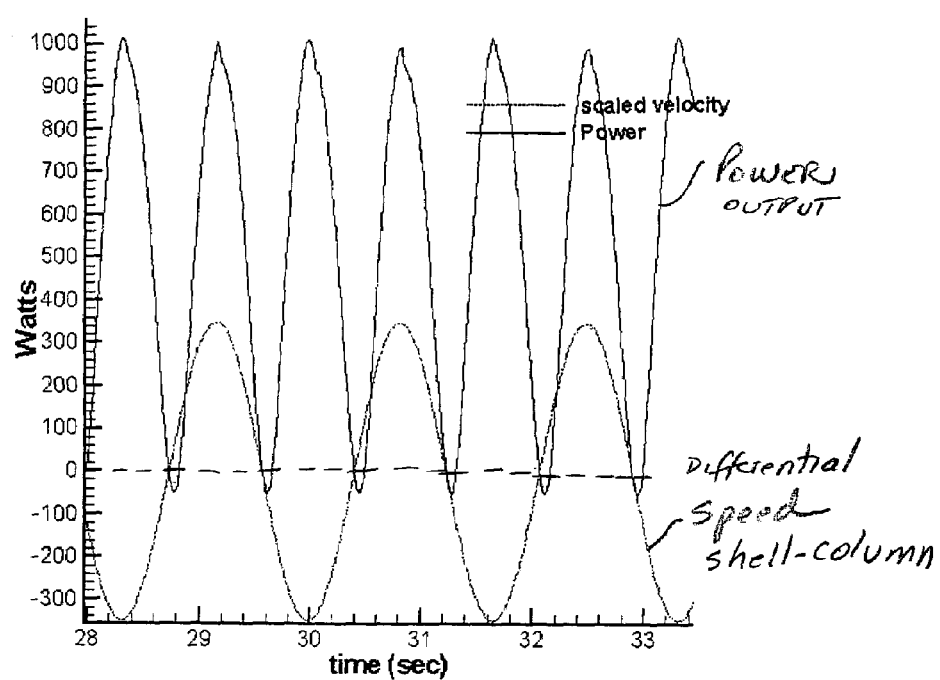

FIG. 15b shows LEG output power as a function of WEC shell to column differential speed. In the example shown, LEG power is maximum when the shell to column speed is greatest. The average power of the WEC is approximately one half the peak power.

It should be appreciated that:
1. As the speed of the PMA or ICA is increased by the lever arm ratio [vleg=vfloat*(a+b)/a], the effective force goes down by the lever arm ratio [power (speed times force) remains the same]. For a 1:1 lever, the relative speed doubles while the effective force is cut in half.
2. But, the required size of the magnet assembly which is roughly proportional to the force (typically 20-25 kN per square meter) may be cut in half, if the force is cut in half. The net result is that the size of the PMA can be reduced significantly (e.g., from 6 square meters to 3 square meters).
3. Reducing the size one component, (i.e., the PMA) by the lever ratio, generally entails that the size (i.e., length) of the other component (e.g. the ICA functioning as the stator) needs to go up by the lever arm ratio. For a 1:1 lever, the stator length doubles while the magnet assembly length halves. Given that the magnet and coil assemblies have some non-zero length, the ratio is not quite proportional to the lever arm ratio.

Benefits of incorporating these features include:
1. Voltage produced at the output of the ICA is proportional to speed for a fixed pole pitch of the PMA. Minimum pole pitch is generally fixed by the width of the air gap that can be maintained. The pole pitch should be at least 25 times the air gap width. Efficiency generally increases with voltage. Therefore, higher speed and voltage generally translates to higher efficiency. Higher voltage is good because current decreases and $I^2R$ losses go down. Also, higher voltage is good because power converter switching devices often have fixed voltage drop (e.g. 1.8V for IGBT transistors).
2. Frequency is proportional to speed for a fixed pole pitch. Minimum pole pitch is generally fixed by the width of the air gap that can be maintained. A passive rectifier system (comprised of a set of diodes and capacitors) generally performs better and/or is smaller for a higher electrical frequency. If voltage ripple is a concern, the higher frequency help reduce the size of the capacitors or the amount of voltage ripple.
3. The permanent magnet assembly is typically the heavier and more expensive piece of the LEG system. Therefore, reducing its size at the expense of increasing the size of the stator generally helps system mass and cost.
4. Shrinking the magnet assembly size has several benefits
   a. Easier to protect from debris pick-up
   b. Easier to protect personnel
   c. Less PMA-ICA attractive force, which simplifies bearing design; (this is important since, for example, a small 1 KW LEG had 4 tons of attractive force.)

What is claimed is:

1. A wave energy converter (WEC) comprising:
a float and a column intended to be placed in a body of water with the float and column moving relative to each other as a function of the waves present in the body of water;
a permanent magnet assembly (PMA) attached to one of the column and float and an induction coil assembly (ICA) attached to the other one of the column and float for causing the PMA and the ICA to move past each other and for voltages to be generated across the ICA when the PMA and the ICA attached to the float and column move relative to each other whereby the relative movement of the float and column is converted into electrical energy;
the PMA being encased in a first enclosure and the ICA being encased in a second enclosure, different and independent of the first enclosure, for facilitating the placement of the PMA and the ICA on their respective portion of the float and column; and
means for maintaining a relatively constant gap between the first and second enclosures as they move past each other to ensure good electromagnetic coupling between the PMA and the ICA; and
wherein the PMA and the ICA are attached to their respective portion of the float and column and are mounted on the walls of the float and column.

2. A WEC as claimed in claim 1, wherein said first and second enclosures are made of a waterproof material to enable the first and second enclosures, containing the PMA and the ICA, to be positioned in water.

3. A WEC as claimed in claim 2, wherein the first and second enclosures are formed of non-ferromagnetic material.

4. A WEC as claimed in claim 3, wherein the enclosure covers are made very thin to substantially reduce eddy current losses.

5. A WEC as claimed in claim 1, wherein the PMA and the ICA are attached to their respective portion of the float and column and are located above the float.

6. A WEC as claimed in claim 1, wherein the PMA and the ICA are attached to their respective portion of the float and column and are located below the float.

7. A WEC as claimed in claim 1, wherein the PMA includes permanent magnets arranged in a surface magnet configuration and wherein the magnets overlie a magnet support structure contained within the first enclosure; and wherein the ICA includes electrically conductive coils wound about a slotted armature core overlying a support structure contained within the second enclosure.

8. A WEC as claimed in claim 7 wherein the magnet support structure and the coil support structure include a ferromagnetic yoke.

9. A WEC as claimed in claim 1, wherein the PMA includes permanent magnets arranged in a buried magnet configuration and wherein the PMA includes a magnet support structure contained within the first enclosure; and wherein the ICA includes electrically conductive coils wound about a slotted armature core including a support structure contained within the second enclosure.

10. A WEC as claimed in claim 9 wherein the magnet support structure includes a ferromagnetic plate overlying a non-ferromagnetic support structure.

11. A WEC as claimed in claim 1 wherein the PMA including a corresponding support structure is attached to one of the column and the float and the ICA including a corresponding support structure is attached to the other one of the float and column.

12. A wave energy converter (WEC) comprising:
a float and a column intended to be placed in a body of water with the float and column moving relative to each other as a function of the waves present in the body of water;
a permanent magnet assembly (PMA) attached to one of the column and float and an induction coil assembly (ICA) attached to the other one of the column and float for causing the PMA and the ICA to move past each other and for voltages to be generated across the ICA when the PMA and the ICA attached to the float and column move relative to each other whereby the relative movement of the float and column is converted into electrical energy;

the PMA being encased in a first enclosure and the ICA being encased in a second enclosure, different and independent of the first enclosure, for facilitating the placement of the PMA and the ICA on their respective portion of the float and column; and means for maintaining a relatively constant gap between the first and second enclosures as they move past each other to ensure good electromagnetic coupling between the PMA and the ICA; and wherein one of the PMA and the ICA, including a corresponding support structure, is attached to an external wall of the float and the other one of the PMA and the ICA is positioned so as to face and interact with the one of the PMA and ICA attached to the outer wall.

13. A WEC as claimed in claim 1, wherein the PMA is divided into segments extending end to end along a first support structure attached to one of the float and column; and wherein the coil assembly extends along a second support structure disposed opposite said first structure; and wherein at least one of wheels and bearings are positioned between the first and second support structures for: (a) maintaining a relatively constant gap between the PMA and the ICA; and (b) facilitating movement between the PMA and the ICA.

14. A wave energy converter (WEC) comprising:

two structures intended to be placed in a body of water, the two structures being able to move relative to each other in response to forces applied to the WEC by the body of water; at least one of the two structures being a wave energy absorber; and means connected between the two structures for producing output electric energy as a function of the relative movement between the two structures including:

a permanent magnet assembly (PMA) attached to one of the two structures and an induction coil assembly (ICA) attached to the other one of the two structures for causing the PMA and the ICA to move past each other and for voltages to be generated across the ICA when the PMA and the ICA attached to the two structures move relative to each other whereby the relative movement of the two structures is converted into electrical energy;

the PMA being encased in a first enclosure and the ICA being encased in a second enclosure, different and independent of the first enclosure, for facilitating the placement of the PMA and the ICA on their respective portion of the two elements;

means for maintaining a relatively constant gap between the first and second enclosures as they move past each other to ensure good electromagnetic coupling between the PMA and the ICA; and wherein the PMA and the ICA are attached to their respective portion of the two elements.

15. A wave energy converter (WEC) comprising:

two bodies intended to be placed in a body of water, the two bodies being able to move relative to each other in response to forces applied to the WEC by the body of water; at least one of the two bodies being a wave energy absorber; and means connected between the two bodies for producing output electric energy as a function of the relative movement between the two bodies including:

a permanent magnet assembly (PMA) attached to one of the two bodies and an induction coil assembly (ICA) attached to the other one of the two bodies for causing the PMA and the ICA to move past each other and for voltages to be generated across the ICA when the PMA and the ICA attached to the two bodies move relative to each other whereby the relative movement of the two bodies is converted into electrical energy;

the PMA being encased in a first enclosure and the ICA being encased in a second enclosure, different and independent of the first enclosure, for facilitating the placement of the PMA and the ICA on their respective portion of the two bodies;

means for maintaining a relatively constant gap between the first and second enclosures as they move past each other to ensure good electromagnetic coupling between the PMA and the ICA including dividing the PMA into segments extending end to end along a first support structure attached to one of the two bodies; and wherein the coil assembly extends along a second support structure disposed opposite said first structure; and wherein at least one of wheels and bearings are positioned between the first and second support structures for maintaining a relatively constant gap between the PMA and the ICA and facilitating movement between the PMA and the ICA.

* * * * *